(12) United States Patent
Ouspenski et al.

(10) Patent No.: US 11,637,315 B2
(45) Date of Patent: Apr. 25, 2023

(54) ELECTROLYTE MATERIAL AND METHODS OF FORMING

(71) Applicant: SAINT-GOBAIN CERAMICS & PLASTICS, INC., Worcester, MA (US)

(72) Inventors: Vladimir Ouspenski, Saint-Pierre-lès-Nemours (FR); Gaurav Assat, Paris (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 17/734,591

(22) Filed: May 2, 2022

(65) Prior Publication Data

US 2022/0263125 A1    Aug. 18, 2022

Related U.S. Application Data

(63) Continuation of application No. 17/444,654, filed on Aug. 6, 2021.

(60) Provisional application No. 63/062,755, filed on Aug. 7, 2020.

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2300/008* (2013.01)

(58) Field of Classification Search
None
See application file for complete search history.

(56) References Cited

U.S. PATENT DOCUMENTS

| 7,132,060 B2 | 11/2006 | Zagumennyi et al. |
| 9,599,727 B2 | 3/2017 | Ouspenski et al. |
| 2005/0188914 A1 | 9/2005 | Iltis et al. |

(Continued)

FOREIGN PATENT DOCUMENTS

| CN | 108701860 A | 10/2018 |
| CN | 111279431 A | 6/2020 |

(Continued)

OTHER PUBLICATIONS

International Search Report and Written Opinion for PCT/US2021/071137, dated Nov. 29, 2021, 12 pages.

(Continued)

*Primary Examiner* — Robert S Carrico
(74) *Attorney, Agent, or Firm* — Abel Schillinger, LLP; Adrian Lawrence

(57) ABSTRACT

A solid electrolyte material can include a halide-based material having a crystalline structure including a disorder. In an embodiment, the solid electrolyte material can include a crystalline structure include stacking faults. In another embodiment, the solid electrolyte material can include a crystalline phase including a crystalline structure represented by a space group of the hexagonal crystal system or a space group of a rhombohedral lattice system. In another embodiment, the solid electrolyte material can include a crystalline phase including a crystalline structure represented by a monoclinic space group and a unit cell containing a reduced number of halogen atoms.

20 Claims, 13 Drawing Sheets

(56) References Cited

U.S. PATENT DOCUMENTS

| | | | |
|---|---|---|---|
| 2010/0098613 | A1 | 4/2010 | Iltis |
| 2019/0088995 | A1 | 3/2019 | Asano et al. |
| 2020/0328455 | A1* | 10/2020 | Sakai ............... H01M 4/62 |
| 2021/0320326 | A1 | 10/2021 | Ouspenski et al. |
| 2021/0320327 | A1 | 10/2021 | Ouspenski et al. |

FOREIGN PATENT DOCUMENTS

| | | |
|---|---|---|
| CN | 111279432 A | 6/2020 |
| CN | 111295720 A | 6/2020 |
| EP | 3496202 A4 | 8/2019 |
| EP | 3496202 A1 | 12/2019 |
| JP | 2018025582 A1 | 5/2019 |
| KR | 20200069215 A | 6/2020 |
| KR | 20200075250 A | 6/2020 |
| WO | 2018025582 A1 | 2/2018 |
| WO | 2019135315 A1 | 7/2019 |
| WO | 2019135316 A1 | 7/2019 |
| WO | 2019135317 A1 | 7/2019 |
| WO | 2019135318 A1 | 7/2019 |
| WO | 2019135319 A1 | 7/2019 |
| WO | 2019135320 A1 | 7/2019 |
| WO | 2019135321 A1 | 7/2019 |
| WO | 2019135322 A1 | 7/2019 |
| WO | 2019135323 A1 | 7/2019 |
| WO | 2019135328 A1 | 7/2019 |
| WO | 2019135336 A1 | 7/2019 |
| WO | 2019135341 A1 | 7/2019 |
| WO | 2019135342 A1 | 7/2019 |
| WO | 2019135343 A1 | 7/2019 |
| WO | 2019135344 A1 | 7/2019 |
| WO | 2019135345 A1 | 7/2019 |
| WO | 2019135346 A1 | 7/2019 |
| WO | 2019135347 A1 | 7/2019 |
| WO | 2019135348 A1 | 7/2019 |
| WO | 2019146216 A1 | 8/2019 |
| WO | 2019146217 A1 | 8/2019 |
| WO | 2019146218 A1 | 8/2019 |
| WO | 2019146219 A1 | 8/2019 |
| WO | 2019146236 A1 | 8/2019 |
| WO | 2019146292 A1 | 8/2019 |
| WO | 2019146293 A1 | 8/2019 |
| WO | 2019146294 A1 | 8/2019 |
| WO | 2019146295 A1 | 8/2019 |
| WO | 2019146296 A1 | 8/2019 |
| WO | 2019146308 A1 | 8/2019 |
| WO | 2020136954 A1 | 7/2020 |
| WO | 2020136956 A1 | 7/2020 |
| WO | 2020175171 A1 | 9/2020 |

OTHER PUBLICATIONS

Asano, T. et al. "Solid Halide Electrolytes with High Lithium-Ion Conductivity for Application in 4 V Class Bulk-Type All-Solid-State Batteries," Advanced Materials, 30 (2018), abstract only.
Bohnsack, A. et al. "Temäre Halogenide vom Typ A3MX6. IV. [1]. Temare Halogenide des Scandiums mit Natrium, Na3ScX6 (X = F, Cl, Br): Synthese, Strukturen, Ionenleitfahigkeit," Zeitschrift fuer Anorganische und Allgemenie Chemie, vol. 622, 1, 1996, pp. 173-178, abstract only.
Bohnsack, A. et al. "Temäre Halogenide vom Typ A3MX6. V. Synthese, Kristallstrukturen und Natrium-Ionenleitfahigkeit der ternären Iodide Na3MI6 (M = Sm, Gd—Dy) sowie der Mischkristalle Na3GdBr6-xIx," Zeitschrift fuer Anorganische und Allgemenie Chemie, vol. 623, 1-6, 1997, pp. 837-843, abstract only.
Bohnsack, A. et al. "Temäre Halogenide vom Typ A3MX6. VI [1]. Ternare Chloride der Selten-Erd-Elemente mit Lithium, Li3MCl6 (M=Tb-Lu, Y, Sc): Synthese, Kristallstrukturen und Ionenbewegung," Zeitschrift fuer Anorganische und Allgemenie Chemie, vol. 623, 7, 1997, pp. 1067-1073, abstract only.
Bohnsack, A. et al. "Temäre Halogenide vom Typ A3MX6. VII [1], Die Bromide Li3MBr6 (M=Sm—Lu, Y): Synthese, Kristallstruktur, Ionenbeweglichkeit," Zeitschrift fuer Anorganische und Allgemenie Chemie, vol. 623, 9, 1997, pp. 1352-1356, abstract only.
Boulineau, A. et al. "Structure of Li2MnO3 with different degrees of defects," Solid State Ionics, vol. 180, issue 40, 2010, pp. 1652-1659, abstract only.
Choi S-J. et al. "LiI-Doped Sulfide Solid Electrolyte: Enabling a High-Capacity Slurry-Cast Electrode by Low-Temperature Post-Sintering for Practical All-Solid-State Lithium Batteries," ACS Applied Materials, 2018, pp. 21404-21412, abstract only.
Gautam, A. et al. "Rapid crystallization and kinetic freezing of site-disorder in the lithium superionic argyrodite Li6PS5Br," Institute of Physical Chemistry, Justus-Liebig-University Giessen, 2019, 31, 22 pages.
Gomboiz, M. et al. "Lithium-Ion Transport in Nanocrystalline Spinel-Type Li[InxLiy]Br4 as Seen by Conductivity Spectroscopy and NMR," Frontiers in Chemistry, Feb. 25, 2020, vol. 8, article 100, pp. 1-10.
Ha, S. et al. "Sodium-Metal Halide and Sodium—Air Batteries," ChemPhysChem, Jun. 20, 2014, abstract only.
Hull, S. et al. "Superionics: crystal structures and conduction processes," Institute of Pgysics Publishing, Reports on Progress in Physics, 67, 2004, pp. 1233-1314.
Kahle, L. et al. "High-throughput computational screening for solid-state Li-ion conductors," Energy & Environmental Science, Issue 3, 2020, abstract only.
Lee, Y-G. et at., "High-energy long-cycling all-solid-state lithium metal batteries enabled by silver-carbon composite anodes," Nature Energy, 2020, vol. 5, pp. 299-308, abstract only.
Li, X. et al. "H2O-Mediated Synthesis of Superionic Halide Solid Electrolyte," Angewandte Chemie International Edition, 10.1002/anie.201909805, 9 pages.
Li, X. et al., ""Air-stable Li3InCl6 electrolyte with high voltage compatibility for all-solid-state batteries,"" Energy & Environmental Science 12(9), 2019, pp. 2665-2671.
Li, X. et al. "Progress and perspectives on halide lithium conductors for all-solid-state lithium batteries," Energy & Enviromental Science, vol. 13, Royal Society of Chemistry, Mar. 3, 2020, pp. 1429-1461.
Liang, J. et al. "Site-Occupation-Tuned Superionic LixScCl3+x Halide Solid Electrolytes for All-Solid-State Batteries," Journal of the American Chemical Society, Mar. 26, 2020, 27 pages.
Mattfeld, H. et al. "Ternare Halogenide vom Typ A3MX6. I A3YCl6 (A = K, NH4, Rb, Cs): Synthese, Strukturen, fhermisches Verhalten. Über einige analoge Chloride der Lanthanide," Zeitschrift fuer Anorganische und Allgemenie Chemie, vol. 618, 12, 1992, pp. 13-17, abstract only.
McGuire, M. et al. "Crystal and Magnetic Structures in Layered, Transition Metal Dihalides and Trihalides," Materials Science and Technology Division, Oak Ridge National Laboratory, 2017, pp. 1-17.
Meyer, G. et al., ""Simple and Complex Halides,"" Handbook on the Physics and Chemistry of Rare Earths, vol. 28, 2000, pp. 53-129.
Meyer, G. et al. ""The Amomonium-Bromide Route to Anhydrous Rare Earth Bromides Mbr"" Journal of the Less-Common Metals, 127, 1987, pp. 155-160.
Muy, S. et al., ""High-Throughput Screening of Solid-State Li-Ion Conductors Using Lattice-Dynamics Descriptors,"" Science, vol. 16, 2019, pp. 270-282.
Ohno, S. et al. "Materials design of ionic conductors for solid state batteries," Prgress in Energy, 2020, 20, 36 pages.
Park, K-H. et al., ""High-Voltage Superionic Halide Solid Electrolytes for All-Solid-State Li-Ion Batteries,"" ACS Energy Letters Jan. 30, 2020, 5, pp. 533-539.
Qie, Y. et al. "Yttrium-Sodium Halides as Promising Solid-State Electrolytes with High Ionic Conductivity and Stability for Na-Ion Batteries," The Joutnal of Physical Chmistry Letters, 2020, 11, pp. 3376-3383.
Saha, S. et al. "Exploring the Bottlenecks of Anionic Redox in Li-rich 1 Layered Sulfides," Nature Energy, 4 (11), 2019, pp. 1-25.
Saha, S. et al. "Polymorphism in Li 4 Zn(PO4) 2 and Stabilization of its Structural Disorder to Improve Ionic Conductivity," Chemistry of Materials, American Chemical Society, 2018, 30(4), pp. 1379-1390.

(56) References Cited

OTHER PUBLICATIONS

Schlem, R. et al. "Lattice Dynamical Approach for Finding the Lithium Superionic Conductor Li3ErI6," ACS Applied Energy Materials, 2020, 3, 4, pp. 3684-3691, abstract only.

Schlem, R. et al., "Mechanochemical Synthesis: A Tool to Tune Cation Site Disorder and Ionic Transport Properties of Li3MCl6 (M = Y, Er) Superionic Conductors," Advanced Energy Materials, 2019, pp. 1-10.

Sendek, A. D. et al. "Machine Learning-Assisted Discovery of Solid Li-Ion Conducting Materials," Chemistry of Materials, 2018, abstract only.

Steiner, H-J. et al., ""Neue schnelle Ionenleiter vom Typ MMIIICI6 (MI = Li, Na, Ag; MIII = In, Y)"" Zeitschrift für anorganische und allgemeine Chemie 613 (1992), pp. 26-30.

Stenzel, F. et al. "Ternäre Halogenide vom Typ A3MX6. II. Das System Ag3-xNaxYCl6: Synthese, Strukturen, Ionenleitfähigkeit," Zeitschrift fuer Anorganische und Allgemenie Chemie, vol. 619, 4, 1993, pp. 652-660, abstract only.

Wickleder, M. et al. "Ternäre Halogenide vom Typ A3MX6. III. Synthese, Strukturen, Ionenleitfahigkeit der Halogenide Na3MX6 (X = Cl, Br)," Zeitschrift fuer Anorganische und Allgemenie Chemie, vol. 621, 3,1995, pp. 457-463, abstract only.

Xiao, Y. et al. "Computational Screening of Cathode Coatings for Solid-State Batteries," Joule, 3, 2019, pp. 1252-1275.

Yu, H. et al. "High-energy 'composite' layered manganese-rich cathode materials via controlling Li2MnO3 phase activation for lithium-ion batteries," Physical chemistry chemical physics, 2012, abstract only.

Zhang, T. et al. "Designing composite solid-state electrolytes for high performance lithium ion or lithium metal batteries," Chemical Science, Royal Society of Chemistry, Jul. 20, 2020, pp. 8686-8707.

\* cited by examiner

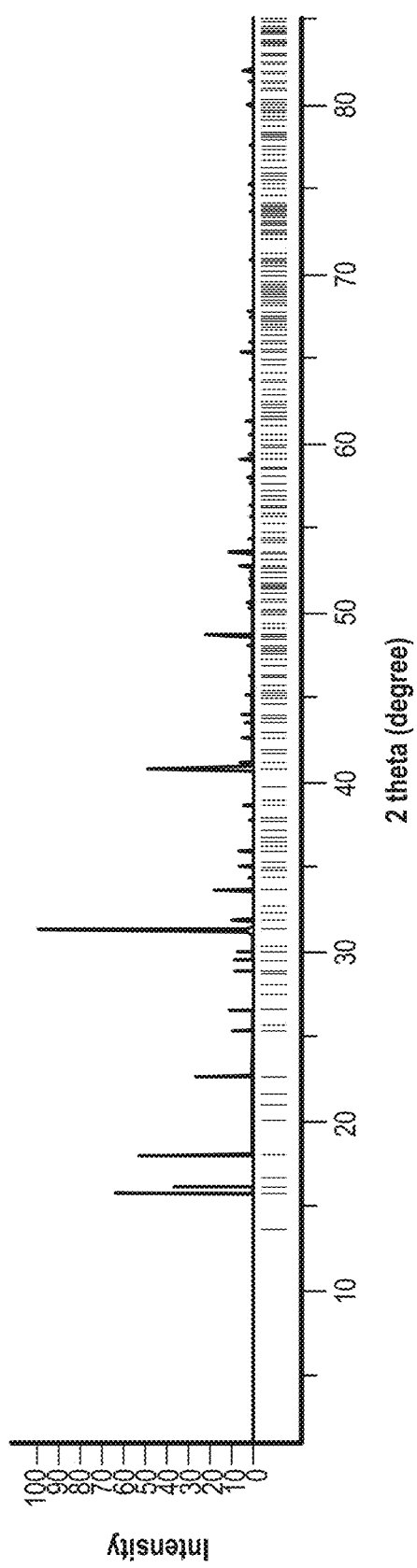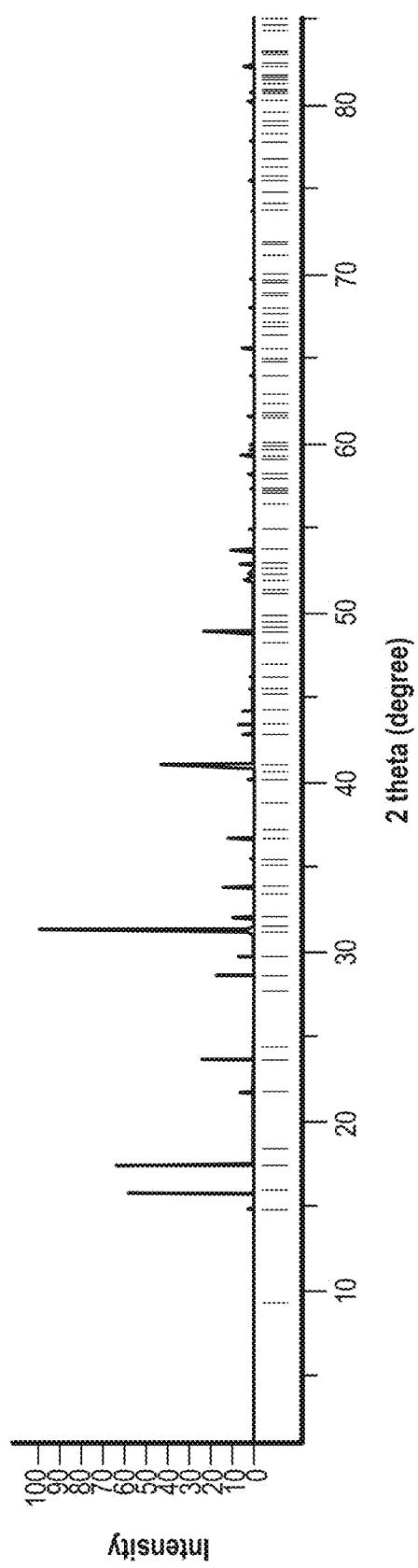
FIG. 7A
FIG. 7B

```
Lattice type          R
Space group name      R-3m
Space group number    166
Setting number        1

Lattice parameters
   a         b         c        alpha     beta     gamma
 3.99232   3.99232  19.35563   90.0000   90.0000  120.0000

Unit-cell volume = 267.170547 Å^3

Structure parameters
                 x         y         z        Occ.      B       Site    Sym.
 1 Li  Li     0.00000   0.00000   0.50000    1.000    1.000     3b      -3m
 2 Y   Y      0.00000   0.00000   0.00000    0.333    1.000     3a      -3m
 3 Li  Li2    0.00000   0.00000   0.00000    0.000    1.000     3a      -3m
 4 Br  Br     0.00000   0.00000   0.26000    1.000    1.000     6c       3m
```

*FIG. 10*

```
Lattice type          C
Space group name      C 2/m
Space group number    12
Setting number        1

Lattice parameters
   a         b         c        alpha     beta      gamma
 6.92100   4.00000   6.85710   90.0000  109.7960   90.0000

Unit-cell volume = 178.613729 Å^3

Structure parameters
                 x         y         z        Occ.      B       Site    Sym.
 1 Y   Y1    0.00000   0.50000   0.00000    0.333    1.000     2b      2/m
 2 Li  Li2   0.00000   0.00000   0.50000    1.000    1.000     2c      2/m
 3 Br  Br2   0.25500   0.00000   0.22000    1.000    1.000     4i       m
```

*FIG. 11*

```
Lattice type          P
Space group name      P 63/m c m
Space group number    193
Setting number        1

Lattice parameters
   a         b         c        alpha     beta     gamma
 6.46748   6.46748   6.03200   90.0000   90.0000  120.0000

Unit-cell volume = 218.505243 Å^3

Structure parameters
                 x         y         z        Occ.      B       Site    Sym.
 1 Cl  Cl1   0.32800   0.00000   0.25000    1.000    0.100     6g      m2m
 2 Y   Y1    0.00000   0.00000   0.00000    0.500    0.100     2b      -3.m
 3 Li  Li1   0.33333   0.66667   0.00000    0.750    0.100     4d       3.2
```

*FIG. 12*

```
Lattice type         P
Space group name     P 63/m m c
Space group number   194
Setting number       1

Lattice parameters
    a        b        c       alpha     beta    gamma
 3.73400  3.73400  6.03200  90.0000  90.0000  120.0000

Unit-cell volume = 72.835078 Å^3

Structure parameters
                  x         y         z        Occ.    B      Site   Sym.
 1 Y   Y       0.00000   0.00000   0.00000   0.167   1.000   2a    -3m.
 2 C1  C1      0.33333   0.66667   0.25000   1.000   1.000   2c    -6m2
 3 Li  Li      0.00000   0.00000   0.00000   0.500   1.000   2a    -3m.
```

FIG. 13

ELECTROLYTE MATERIAL AND METHODS OF FORMING

CROSS-REFERENCE TO RELATED APPLICATION(S)

This application is a continuation of and claims priority under 35 U.S.C. § 120 to U.S. patent application Ser. No. 17/444,654, entitled "ELECTROLYTE MATERIAL AND METHODS OF FORMING," by Vladimir OUSPENSKI et al., filed Aug. 6, 2021, which claims priority under 35 U.S.C. § 119(e) to U.S. Provisional Patent Application No. 63/062,755, entitled "ELECTROLYTE MATERIAL AND METHODS OF FORMING," by Vladimir OUSPENSKI et al., filed Aug. 7, 2020, all of which are assigned to the current assignee hereof and incorporated herein by reference in their entireties for all purposes.

FIELD OF THE DISCLOSURE

The following is directed to an electrolyte material and methods of forming the same, and to, in particular, a solid electrolyte material including a disorder in the crystalline structure and methods of forming the same.

DESCRIPTION OF THE RELATED ART

Solid-state lithium batteries, by enabling lithium metal anode, are expected to provide higher energy densities and faster recharging times and cause less safety concerns compared to conventional lithium-ion batteries. The industry continues to demand improved solid electrolyte materials.

BRIEF DESCRIPTION OF THE DRAWINGS

The present disclosure may be better understood, and its numerous features and advantages made apparent to those skilled in the art by referencing the accompanying drawings.

FIGS. 7A to 7E include spectrums of X-ray diffraction simulation of different halide-based electrolyte materials.

FIGS. 10 to 13 include crystalline structure models of solid electrolyte materials.

Figure 1A:
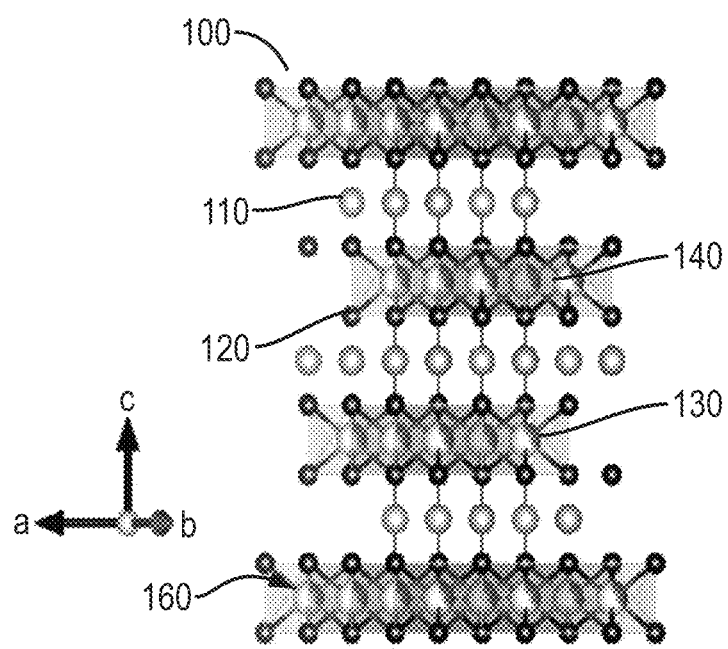
FIG. 1A includes an illustration of a crystalline structure of an exemplary solid electrolyte material according to an embodiment.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes", "including", "has", "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to a solid electrolyte material including a halide-based electrolyte material including a particular disorder in the crystalline structure. The solid electrolyte material demonstrates improved properties comparing to another material having the same composition without the disorder. Improved properties can include ionic conductivity, mechanical properties including deformability or plasticity, electrochemical stability, chemical stability, thermal stability, electronic resistivity, particle morphology and/or size, electrode wettability, and/or the like, or any combination thereof. The solid electrolyte material can be used in an electrochemical device, such as a solid-state lithium-ion battery. Embodiments further relate to methods of forming the solid electrolyte material having a particular disorder in the crystalline structure. The methods can allow controlled formation of the disorder in the crystalline structure and at the same time allows control over crystallinity of the material.

In an embodiment, the solid electrolyte material can include a halide-based electrolyte material represented by $M_{3-z}(Me^{k+})_f X_{3-z+k*f}$, wherein $-3 \leq z < 3$; k is the valence of Me and $2 \leq k < 6$; $0 \leq f \leq 1$; M includes an alkali metal, Me includes a metal other than an alkali metal, and X includes a halogen. In a further embodiment, the halide-based electrolyte material can be a complex metal halide. In particular aspects, f is not zero. In instances where Me includes more than one metal element, k can be the average of the total of the valence of each Me metal element. For example, when Me includes a trivalent element and a tetravalent element in equal molar quantity, $k=(3+4)/2=3.5$. In a particular aspect, k may be 2 or 3 or 4 or 5.

After reading the instant application, a skilled artisan can understand that atomic vacancy can be present inside the unit cell of the halide-based material. To aid understanding of the crystalline structure, atomic vacancy can be added to the formula of the halide-based material, and the formula including atomic vacancy can be $M_3-(Me^{k+})_f \square_y X_{3-z+k*f}$, wherein $\square$ represents atomic vacancy inside the unit cell and y is the number of vacant atomic positions. In a particular embodiment, y can be $f*(k-1)$.

In an aspect, M can include at least one of Li and Na. For example, M can include Li, Na, or a combination thereof. In another aspect, M can include Li, Na, K, Rb, Cs, or any combination thereof. In a further aspect, M can consist of one or more alkali metal element. For example, M can consist essentially of one or more alkali metal element selected from the group consisting of Li, Na, K, Rb, and Cs. In another example, M can consist of Li. In yet another instance, M can consist of a combination of Li and at least one of Na, K, Rb, and Cs. In still another instance, M can consist of Na and at least one of Cs an Rb. In another instance, M can consist of at least one of Na and Cs.

In another aspect, Me can include an alkaline earth metal element, 3d transition metal, a rare earth element, Zn, Zr, Hf, Ti, Sn, Th, Ge, V, Ta, Nb, Mo, W, Sb, Te, In, Bi, Al, Ga, Cu, or any combination thereof. For example, Me can include an alkaline earth element including Mg, Ca, Sr, or Ba, Zn, Cu, or any combination thereof. In another example, Me can include a rare earth element. In a particular implementation, Me can consist of one or more of a rare earth element. In another particular example, Me can include Y, Ce, Gd, Er, Zr, La, Cu, Yb, In, Mg, Zn, Sn or any combination thereof.

In an aspect, X can include a halogen including Cl, Br, I, or any combination thereof. In an example, X can include at least one of Cl and Br. In a particular implementation, X can consist of Cl, Br, or a combination thereof. In a particular example, X can be one or more halogen.

In another embodiment, the halide-based material can include a phase including $NH_4^+$. In a particular aspect, the halide-based material may be represented by $(NH_4)_n M_{3-z}(Me^{k+})_f X_{n+3-z+k*f}$, wherein $n>0$. The symbolic letters, such as M, Me, n, f, Z, X, and k, are used in formulas of embodiments herein. As used in this disclosure, the same symbolic letters noted in different embodiments are intended to refer to the same or similar elements or values. Particular elements or values described for a symbolic letter in an embodiment can be applied to another embodiment when the same symbolic letter is used. For example, descriptions of M, Me, X, f, z, and k in the above embodiments can be applied in this and other embodiments of this disclosure.

In a particular embodiment, the halide-based electrolyte material can be represented by $Li_{3-z}Me^{k+}X_{3-z+k}$. When z is not 0, the complex metal halide can be non-stoichiometric. When z is 0, the complex metal halide can be stoichiometric. In a particular instance, $-0.95 \leq z \leq 0.95$. In another particular instance, Me includes Y, Gd, Yb, Zr, In, Sc, Zn, Mg, Ca, Ba, Sn or a combination thereof, and X is Cl, Br, or a combination thereof.

In a further embodiment, the halide-based electrolyte material can be represented by $Li_3MeBr_6$. In a further embodiment, the halide-based electrolyte material can be represented by $Li_3MeCl_6$. In a particular example, Me can consist of at least one metal element having the valence of 3. In another particular example, Me can include one or more of metal elements, wherein the average valence of the one or more metal elements is 3.

In another particular embodiment, the halide-based electrolyte material can consist of Li, Y, and at least one of Cl and Br. For example, the halide-based electrolyte material can consist of Li, Y, and Cl. In another example, the halide-based electrolyte material can consist of Li, Y, and Br. In still another example, the halide-based electrolyte material can consist of Li, Y, Cl, and Br. In a particular example, the halide-based electrolyte material can be represented by $Li_{3x}Y_{1-x}Cl_3$ or $Li_{3x}Y_{1-x}Br_3$, wherein $0 < x < 0.5$.

In another particular embodiment, the halide-based electrolyte material can consist of Li, Gd, and at least one of Cl and Br. For example, the halide-based electrolyte material can consist of Li, Gd, and Cl. In another example, the halide-based electrolyte material can consist of Li, Gd, and Br. In still another example, the halide-based electrolyte material can consist of Li, Gd, Cl, and Br. In a particular example, the halide-based electrolyte material can be represented by $Li_{3x}Gd_{1-x}Cl_3$ or $Li_{3x}Gd_{1-x}Br_3$, wherein $0.01 \leq x < 1$.

A particular example of the halide-based material can include $Li_3YCl_6$, $Li_3YBr_6$, $Li_{2.7}Y_7Zr_{0.3}C_6$, $Li_{2.8}Y_{0.8}Sn_{0.2}Cl_6$, $Li_{3.2}Y_{0.8}Zn_{0.2}Cl_6$, $Li_{3.2}Y_{0.8}Mg_{0.2}Cl_6$, $Li_3Y_{1/3}Zr_{1/3}Mg_{1/3}Cl_6$, $Li_3Y_{1/3}Sn_{1/3}Mg_{1/3}Cl_6$, $Li_3Y_{1/3}Zr_{1/3}Zn_{1/3}Cl_6$, $Li_{2.95}Na_{0.05}YBr_6$, $Li_{2.95}K_{0.05}YBr_6$, $Li_{2.95}Cs_{0.05}YBr_6$, $Li_3Y_{0.7}Gd_{0.3}Br_6$, $Li_3Y_{0.8}Yb_{0.2}Br_6$, $Li_3Y_{0.9}La_{0.1}Br_6$, $Li_{2.9}Y_{0.9}Ce_{0.1}Br_6$, or $Li_3Y(Cl,Br)_6$.

In an embodiment, the halide-based electrolyte material can include a crystalline phase including a crystalline structure different from a conventional crystalline structure. For example, the crystalline structure can include a disorder comparing to the conventional crystalline structure. The conventional structure, as used herein, is intended to refer to the ordered crystalline structure of the halide-based material having the same composition. The crystalline structure can include a feature including crystal system, lattice system, space group, one or more unit cell parameters including unit cell volume, values of a, b, c, or any combination thereof, atom numbers within a unit cell, stacking order, atomic vacancy, occupation of vacancy, or any combination thereof. A disorder can be a change of order related to any of the features.

In an embodiment, the halide-based electrolyte material can include a crystalline structure including a layered atomic arrangement, wherein the crystalline structure can include a disorder. In an aspect, the crystalline structure can include atoms arranged in layers, wherein stacking of the layers can include a disorder. In an example, the crystalline structure can include stacking faults. Stacking faults represent a defect in the crystalline structure caused by shifting of occupied or vacant atomic positions that generates disordering of crystallographic planes in the crystalline structure.

Figure 1C:
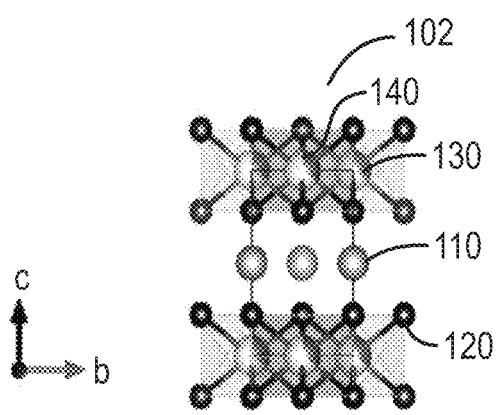
FIG. 1C includes an illustration of a crystalline structure of another exemplary solid electrolyte material according to an embodiment.
Figure 1B:
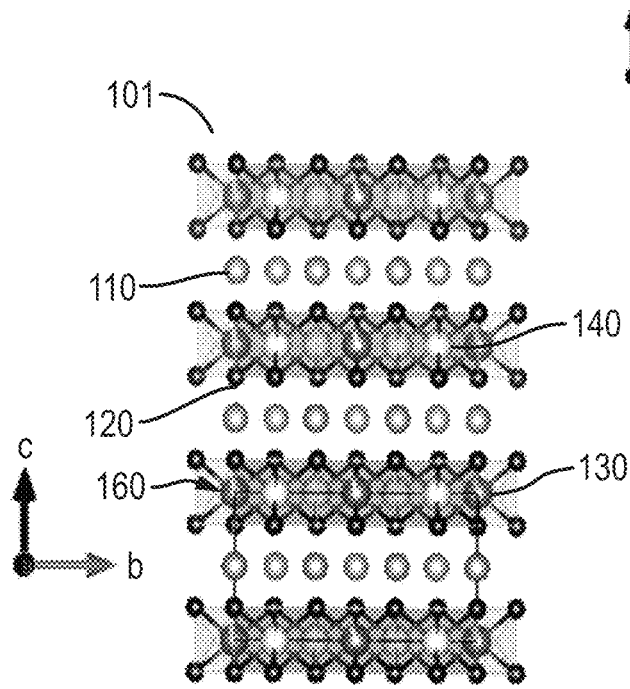
FIG. 1B includes an illustration of another crystalline structure.

Briefly turning to FIGS. 1A, 1B and 1C, different crystalline structures of halide-based materials having the same composition are illustrated. FIG. 1A includes an illustration of a particular crystalline structure of an example of an embodiment, and FIG. 1B includes a conventional crystalline structure of a halide-based material. FIG. 1C includes an illustration of a particular crystalline structure of an example of another embodiment. The crystalline structures 100, 101 and 102 include layers including atoms 110, 120, and 130. In the structure 101, positions of the same atoms (i.e., atoms 110, 120, or 130) in different layers remain the same in the stack, and positions of the atoms 110, 120, and 130 and vacancies 140 follow the same pattern across layers in the structure 101. As illustrated, the structure 101 includes ordered stacking of layers of atoms and vacancies. Stacking faults are included in the structure 100 and 102, as at least some atom positions of atoms 110, 120, or 130 are shifted comparing to the positions of the same atoms in different layers or comparing to the positions of the same atoms in the structure 100. After reading the present disclosure, a skilled artisan can understand shifting of positions of atoms across layers of the crystal structure can be probabilistic and stacking faults of the halide-based material are not limited to the particular examples illustrated in FIGS. 1A and 1C. The halide-based materials of embodiments herein can include stacking faults greater than the structure illustrated in FIG. 1B (0% or near 0%) and up to 100% as illustrated in FIGS. 1A and 1C. A skilled artisan can further appreciate only a small portion representative of the structure 100, 101, and 102 is illustrated in FIGS. 1A to 1C, respectively.

In a particular embodiment, the halide-based material can include a crystalline structure including a particular amount of stacking faults that can facilitate improved property of the halide-based material. Stacking faults can lead to changes to the powder X-ray diffraction pattern, particularly leading to uneven broadening of only certain X-ray diffraction peaks. Stacking faults can be determined by using powder X-ray diffraction analysis of the halide-based material and a DIFFaX simulation and Rietveld refinement by using software, such as TOPAS 4.2 by Bruker Germany or FullProf (version 7.30, published in March, 2020), or another version or software equivalent to TOPAS 4.2 or FullProf version 7.30, following the stacking faults quantification method described by Boulineau et al, Solid State Ionics 180 (2010) 1652-1659, which is incorporated herein by reference in its entirety. In brief, the quantification method can include fitting the simulation to the X-ray diffraction pattern of powder of the halide-based material. The simulation can define primary blocks of the crystalline structure. These primary blocks can be constituted by a slab and an interslab space. The primary blocks can then be stacked according to one of the two or more possible stacking vectors. The exclusive occurrence of only one of the stacking vectors leads to the perfect stacking, i.e., 0% stacking faults, such as the structure 101 illustrated in FIG. 1B. Alternations of the stacking vectors in the stacking direction of the crystalline structure create stacking faults. Fitting of the simulation to the X-ray diffraction pattern of the halide-based material can include varying one or more parameters of the crystalline structure (also known as "parameter refinement") and implementing a least-square difference minimization algorithm, and stacking faults can be identified and quantified. Alternatively, FAULTS software can be used in lieu of the stacking faults quantification method described by Boulineau following Rietveld refinement.

In an aspect, the crystalline structure can include at least 20% stacking faults, such as at least 25%, at least 30%, at least 40%, at least 50%, at least 60%, at least 70%, at least 80%, or at least 90% stacking faults. In another aspect, the stacking of the atomic layers can be completely disordered. For example, the crystalline structure can include 100% stacking faults. In another aspect, the stacking faults may be at most 99%, such as at most 95%, at most 92%, at most 90%, at most 85%, at most 80%, at most 75%, or at most 70%. Moreover, the crystalline structure can include stacking faults in a range including any of the minimum and maximum percentages noted herein. In a particular example, the solid electrolyte material can include a halide-based material having a crystalline structure including at least 50%. In another particular example, the solid electrolyte material can include a halide-based material having greater than 50% and at most 100% stacking faults.

A particular example of the halide-based material can include lithium yttrium bromide including at least 50% stacking faults.

In a particular embodiment, the halide-based material can include the crystalline structure of the monoclinic crystal system including stacking faults. In a particular aspect, the crystalline structure may be presented by space group C2/m. For example, the halide-based material can include lithium yttrium bromide including a crystalline structure represented by C2/m including stacking faults. In another embodiment, the halide-based material can include a crystalline structure of the rhombohedral lattice system or of the hexagonal crystal system including stacking faults.

Another particular example of the halide-based material can include at least 50% stacking faults in the stacking direction along the c-axis of the monoclinic cell such that the three stacking vectors are (0; 0; 1) (½; −⅙; 1) and (⅙; −⅙; 1). A particular example of such halide-based material can include lithium yttrium bromide. The halide-based material having the particular stacking faults described in embodiments herein can have improved properties, such as ion conductivity. For example, lithium yttrium bromide having at least 50% stacking faults along the c-axis of the monoclinic unit cell according to vectors (0; 0; 1) (½; −⅙; 1) and (⅙; −⅙; 1) can have improved ion conductivity compared to conventional lithium yttrium bromide. An exemplary lithium yttrium halide of embodiments herein can have ionic conductivity at room temperature from 1.7 to 3.1 mS/cm.

Further disorder of positions of atoms 130 and vacancies 140 are also included in FIGS. 1A and 1C comparing to FIG. 1B. As illustrated, the positions of atoms 130 are highly mixed with vacancies 140 in the structures 100 and 102. A skilled artisan can appreciate the structures 100 and 102 are novel crystalline structures resulted from the highly mixed positions of atoms 130 and vacancies. As illustrated in the particular example of the crystalline structure 100, the atoms 130 are highly mixed with the vacancies 140. Similarly, the atoms 130 in the crystalline structure 102 are highly mixed with vacancies 140. As illustrated in the crystalline structure 101, ordering of positions of atoms 130 and vacancies 140 are present as atoms 130 take separate positions than vacancies 140. FIGS. 1A to 1C are further discussed later in this disclosure.

In another embodiment, the halide-based material can include a crystalline phase including a crystalline structure different from a conventional crystalline structure. In an aspect, the halide-based material can include a crystalline phase having a crystalline structure represented by a space group different from the conventional crystalline structure. In a particular embodiment, the solid electrolyte material can include the halide-based material including the first and the second crystalline phases that are integrated at the atomic level, at nanometric-domain-level, or both. The nearest atomic distances are usually less than 0.5 nm, and nanometric domain can have a larger size than the nearest atomic distances, such as greater than 1 nm. In an aspect, the halide-based material can include a first crystalline phase having a first crystalline structure represented by a first space group and a second crystalline phase having a second crystalline structure represented by a second space group different than the first space group, wherein at least the first crystalline structure represented by the first space group is different from the conventional crystalline structure. In particular, the first space group is different from the space group of the conventional crystalline structure.

In a particular aspect, the halide-based material can include the first crystalline phase at a particular concentration that can facilitate improved property of the solid electrolyte material. For example, the solid electrolyte material can include the halide-based material having the first crystalline phase at a concentration of at least 1 wt % for the total weight mass of the halide-based material, such as at least 4 wt %, at least 5 wt %, at least 8 wt %, at least 10 wt %, at least 15 wt %, at least 20 wt %, at least 25 wt %, at least 30 wt %, at least 35 wt %, at least 40 wt %, at least 45 wt %, at least 50 wt %, at least 60 wt %, at least 70 wt %, at least 80 wt %, or at least 90 wt %. In still another example, the halide-based material can include the first phase at a concentration of at most 95 wt %, such as at most 90 wt %, at most 85 wt %, at most 80 wt %, at most 70 wt %, at most 65 wt %, at most 60 wt %, at most 55 wt %, at most 50 wt %, at most 45 wt %, at most 40 wt %, at most 30 wt %, at most 25 wt %, at most 15 wt %, at most 8 wt %, or at most 5 wt %. Moreover, the halide-based material can include the first phase at a concentration in a range including any of the minimum and maximum percentages noted herein.

In another aspect, the halide-based material can include the second phase at a particular concentration that can facilitate improved property of the solid electrolyte material. In an example, For example, the solid electrolyte material can include the halide-based material having the second crystalline phase at a concentration of at least 1 wt % for the total weight of the halide-based material, such as at least 4 wt %, at least 5 wt %, at least 8 wt %, at least 10 wt %, at least 15 wt %, at least 20 wt %, at least 25 wt %, at least 30 wt %, at least 35 wt %, at least 40 wt %, at least 45 wt %, at least 50 wt %, at least 60 wt %, at least 70 wt %, at least 80 wt %, or at least 90 wt %. In still another example, the halide-based material can include the second phase at a concentration of at most 95 wt %, such as at most 90 wt %, at most 85 wt %, at most 80 wt %, at most 70 wt %, at most 65 wt %, at most 60 wt %, at most 55 wt %, at most 50 wt %, at most 45 wt %, at most 40 wt %, at most 30 wt %, at most 25 wt %, at most 15 wt %, at most 8 wt %, or at most 5 wt %. Moreover, the halide-based material can include the second phase at a concentration in a range including any of the minimum and maximum percentages noted herein. In exemplary implementations, the second phase can have the conventional crystalline structure. In further exemplary implementations, the second phase can have the second crystalline structure that is different from the conventional structure, and in particular implementations, the second space group can be different from the space group of the conventional structure.

In a further aspect, the halide-based material can include a third phase having a third crystalline structure including a crystalline structure feature that is different than the second and/or the first crystalline structure. In a particular aspect, the third crystalline structure can be represented by a third space group different from the first space group and the second space group. In a further aspect, the halide-based material can include the third phase at any concentration described with respect to the concentrations of the first phase or the second phase. In still a further aspect, the halide-based material can include an amorphous phase. The amorphous phase may be at a concentration of at most 10 wt %, or at most 5 wt %, or at most 1 wt %. It is to be appreciated the total of the concentration of each phase included in the halide-based material makes up to 100 wt %.

In another embodiment, the halide-based material can consist essentially of a crystalline phase having the crystalline structure represented by a space group that is different from the space group of the conventional crystalline structure.

In a particular embodiment, the solid electrolyte material can include the halide-based material including a first phase having a first crystalline structure represented by the first space group, wherein the first space group can be a space group of the rhombohedral lattice system. The rhombohedral lattice system includes 7 space groups including R3, R-3, R32, R3m, R3c, R-3m, and R-3c space group. In a particular aspect, the first crystalline phase can have the first crystalline structure represented by R-3m space group. In another aspect, the second crystalline phase can be represented by a space group of the monoclinic crystal system. In a particular aspect, the second phase can include a crystalline structure represented by C2/m. A particular example of the halide-based material can include a crystalline phase having a crystalline structure represented by R-3m and a crystalline phase having a crystalline structure represented by C2/m. A further particular example of the halide-based material can consist of a first crystalline phase having a crystalline structure represented by R-3m and a second crystalline phase having a crystalline structure represented by C2/m. A further particular example of the halide-based material can consist of a first crystalline phase having a crystalline structure represented by R-3m and a second crystalline phase having a crystalline structure represented by C2/m and a third crystalline phase having a crystalline structure represented by Fd-3m or Fm-3m. In another particular example, the halide-based material can consist of the crystalline phase having the crystalline structure represented by R-3m.

Referring to FIGS. 1A, 1B and 1C, FIG. 1A includes an illustration of a particular example of the crystalline structure represented by R-3m of an embodiment, FIG. 1B includes an illustration of a conventional crystalline structure represented by C2/m, and FIG. 1C includes an illustration of a crystalline structure represented by C2/m space group of an embodiment. In a particular example, the halide-based electrolyte material can include lithium yttrium bromide that includes a first phase having the crystalline structure represented by R-3m, as illustrated in FIG. 1A, and a second phase having the crystalline structure represented by C2/m, as illustrated in FIG. 1B, wherein the first and second crystalline phases are integrated at the atomic level, at nanometric-domain-level, or both. In another particular example, the halide-based solid electrolyte material can include lithium yttrium bromide that can consist of the crystalline phase having the crystalline structure represented by R-3m, as illustrated in FIG. 1A.

In another embodiment, the solid electrolyte material can include the halide-based material including a phase having a crystalline structure represented by a space group of the hexagonal crystal system. The hexagonal crystal system includes 27 space groups including P6, P6$_1$, P6$_5$, P6$_2$, P6$_4$, P6$_3$, P$\bar{6}$, P6/m, P6$_3$/m, P622, P6$_1$22, P6$_5$22, P6$_2$22, P6$_4$22, P6$_3$22, P6mm, P6cc, P6$_3$cm, P6$_3$mc, P$\bar{6}$m2, P$\bar{6}$c2, P$\bar{6}$2m, P$\bar{6}$2c, P6/mmm, P6/mcc, P6$_3$/mcm, and P6$_3$/mmc. In an aspect, the halide-based material can include a crystalline phase having a crystalline structure represented by any one of the space groups of the hexagonal crystal system. In a particular aspect, the halide-based material can include a crystalline phase having a crystalline structure represented by P6$_3$/mcm. In another aspect, the halide-based material can include a crystalline phase having a crystalline structure represented by P6$_3$/mmc space group. In a particular aspect, the solid electrolyte material can consist essentially of the crystalline phase having the crystalline structure represented by P6$_3$/mcm. In another particular aspect, the solid electrolyte material can consist essentially of the crystalline phase having the crystalline structure represented by P6$_3$/mmc space group.

In another embodiment, the halide-based material can include a first crystalline phase having a first crystalline structure represented by a space group of the hexagonal crystalline structure and a second phase having a second crystalline structure represented by a space group of a crystal system other than the hexagonal crystalline structure. In an aspect, the second phase can have a crystalline structure represented by a space group of the trigonal crystal system. In a particular aspect, the second phase can have a second crystalline structure represented by P-3m1. In a further aspect, the second phase can have a crystalline structure represented by a space group of the orthorhombic crystalline structure. In another particular aspect, the second phase can have a second crystalline structure represented by Pnma space group.

In a particular embodiment, the halide-based electrolyte material can include a first phase having a first crystalline structure represented by P6$_3$/mcm or P6$_3$/mmc and a second phase having a second crystalline structure represented by P-3m1 or Pnma. In still another particular embodiment, the halide-based electrolyte material can consist of a first phase having a first crystalline structure represented by P6$_3$/mcm or P6$_3$/mmc and a second phase having a second crystalline structure represented by P-3m1 or Pnma.

Figure 2A:
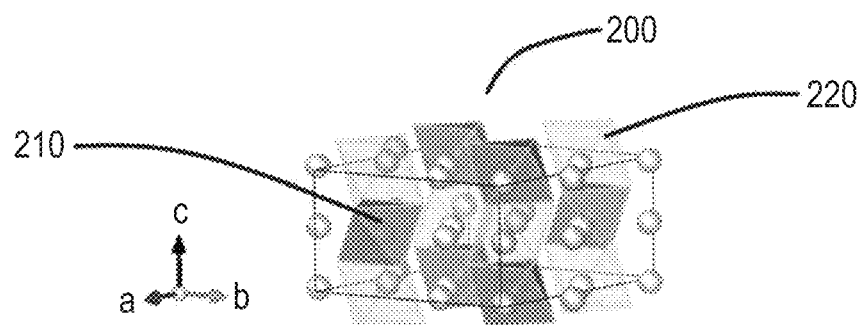
FIG. 2A includes an illustration of a further crystalline structure.
Figure 2B:
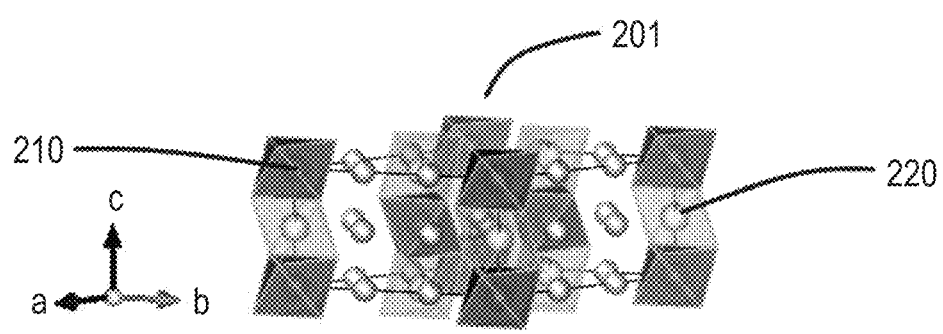
FIG. 2B includes an illustration of another crystalline structure.
Figure 2C:
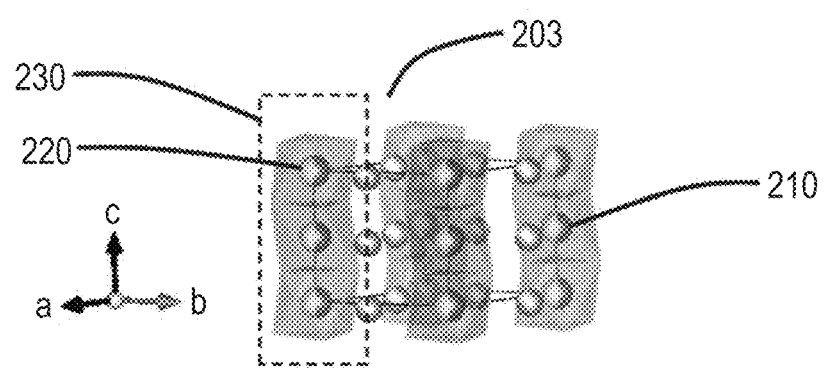
FIG. 2C includes an illustration of a crystalline structure of another exemplary solid electrolyte material according to an embodiment.
Figure 2D:
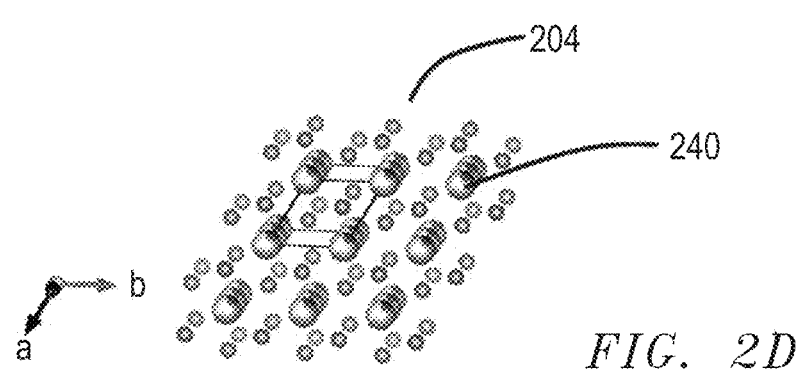
FIG. 2D includes an illustration of a crystalline structure of another exemplary solid electrolyte material according to an embodiment.

Referring to FIGS. 2A to 2D, FIG. 2A includes an illustration of a crystalline structure 200 represented by Pnma, FIG. 2B includes illustration of a crystalline structure 201 represented by P-3m1, and FIG. 2C includes an illustration of the crystalline structure 202 represented by P6$_3$/mcm of a particular example of an embodiment. FIG. 2D includes an illustration of the crystalline structure 203 represented by P6$_3$/mmc of a particular example of an embodiment.

In a particular example, the halide-based electrolyte material can include lithium yttrium chloride that includes a first phase having the crystalline structure represented by P6$_3$/mcm, as illustrated in FIG. 2C, or P6$_3$/mmc, as illustrated in FIG. 2D, and a second phase having the crystalline structure represented by Pnma, as illustrated in FIG. 2A, or P-3m1, as illustrated in FIG. 2B, wherein the first and second crystalline phases are integrated at the atomic level, at nanometric-domain-level, or both. In another particular example, the halide-based solid electrolyte material can include lithium yttrium chloride that can consist of the crystalline phase having the crystalline structure represented by P6$_3$/mcm, as illustrated in FIG. 2C, or P6$_3$/mmc, as illustrated in FIG. 2D. In another particular example, the halide-based solid electrolyte material can include lithium yttrium chloride that can consist of first phase having the crystalline structure represented by P6$_3$/mcm, as illustrated in FIG. 2C, or P6$_3$/mmc, as illustrated in FIG. 2D, and a second phase having the crystalline structure represented by Pnma, as illustrated in FIG. 2A, or P-3m1, as illustrated in FIG. 2B.

In an embodiment, the solid electrolyte material can include a halide-based material including a crystalline structure including a different number of atoms in a unit cell compared to a conventional crystalline structure. In an aspect, the halide-based material can include a crystalline structure including a disordered unit cell compared to a conventional structure. In a further aspect, the disordered unit cell may differ from the conventional crystalline structure in the number of halogen atoms, the number of atoms of M, such as Li, the number of atoms of Me, unit cell parameters, the volume of the unit cell, such as a smaller unit cell, or any combination thereof. In another aspect, the halide-based material can include a crystalline structure including a unit cell containing less halogen atoms compared to the conventional crystalline structure.

In another particular embodiment, the halide-based material can include a crystalline structure including a unit cell including less than 12 halogen atoms. In an aspect, the number of halogen atoms in the unit cell may be at most 10, at most 8, at most 6, at most 5, or at most 4. In another aspect, the number of halogen atoms in the unit cell may be at least 1, at least 2, at least 3, or at least 4. Moreover, the halide-based material can include a crystalline structure including a unit cell including halogen atoms in a range including any of the minimum and maximum values noted herein. For example, the halide-based material can include 2 to 6 halogen atoms in the unit cell.

In a further embodiment, the halide-based material can include a crystalline structure represented by a monoclinic space group and including a unit cell having a disorder. In an aspect, the space group can be C2/m. In another aspect, the unit cell can include less than 12 halogen atoms. In a particular aspect, the halide-based material can include a crystalline structure represented by a monoclinic space group and including a unit cell including from 3 to 5 halogen atoms.

In a further embodiment, the halide-based material can include a crystalline structure represented by a space group of the hexagonal crystal system, wherein a unit cell can include halogen numbers less than 12. In an aspect, the space group can be R-3m. In another aspect, the unit cell can include at most 8 halogen atoms. In at least one particular aspect, the halide-based material can include a crystalline structure represented by a space group of the hexagonal crystal system and including a unit cell having at most 6 halogen atoms. In another aspect, the halide-based material can include a crystalline structure represented by a space group of the hexagonal crystal system and including a unit cell having at least 1.5 halogen atoms.

In a further embodiment, the halide-based material can include a crystalline structure represented by a space group of the rhombohedral lattice system, wherein a unit cell can include halogen numbers less than 12. In an aspect, the unit cell can include at most 8 halogen atoms.

A conventional C2/m unit cell includes 12 halogen atoms. For example, a conventional Li$_3$MeBr$_6$, such as Li$_3$YBr$_6$, includes 12 Bromine atoms in a unit cell. A representative example of Li$_3$YBr$_6$ of an embodiment can include less than 12 bromine atoms, such as at most 6 bromine atoms, or at most 4 bromine atoms. A particular example of Li$_3$YBr$_6$ can have a smaller monoclinic unit cell having 4 atoms of Br.

Another particular example of $Li_3YBr_6$ of an embodiment can include an R-3m unit cell containing 6 Br atoms.

In an embodiment, the solid electrolyte material can include a halide-based material including a crystalline structure including a particular unit cell characteristic. In an aspect, the halide-based material can include a unit cell, wherein unit cell parameters a, b, and c can independently have a particular value A, B, and C, respectively. In another aspect, the unit cell can include a particular volume, a particular normalized volume, or any combination thereof.

Figure 3:
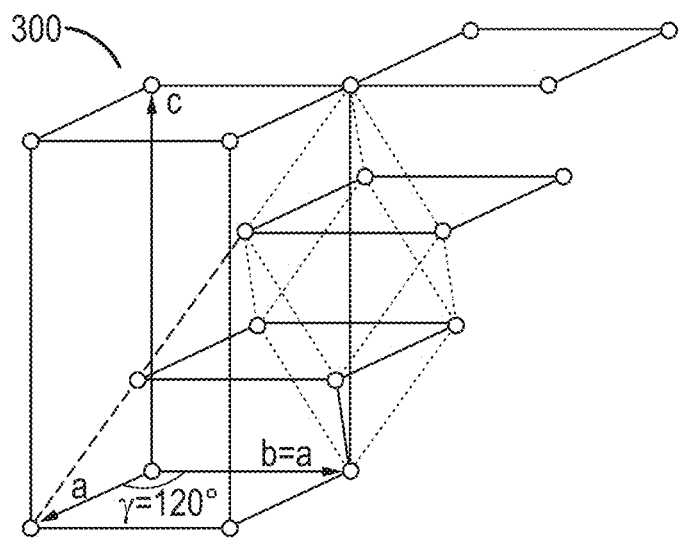
FIG. 3 includes an illustration of a crystalline structure.

In a particular embodiment, the halide-based material can include a crystalline structure represented by a rhombohedral space group, wherein unit cell parameters a and b can be equal. Referring to FIG. 3, a rhombohedral unit cell 300 is illustrated including parameters a, b, and c. In a particular aspect, the unit cell can be R-3m space group. In an aspect, A or B or both can include a particular value. For example, A or B can be at least 3.0 Angstroms, at least 3.3 Angstroms, at least 3.6 Angstroms, or at least 3.9 Angstroms. In another instance, A or B can be at most 4.8 Angstroms, at most 4.6 Angstroms, at most 4.3 Angstroms, at most 4.2 Angstroms, or at most 4.0 Angstroms. Moreover, A or B can be in a range including any of the minimum and maximum values noted herein. In a further aspect, the halide-based material can include a crystalline structure including a particular C. In an example, C can be at least 15 Angstroms, at least 17 Angstroms, or at least 19 Angstroms. In another instance, C can be at most 21 Angstroms, at most 20.2 Angstroms, or at most 19.5 Angstroms. Moreover, C can be in a range including any of the minimum and maximum values noted herein.

In a further aspect, a rhombohedral unit cell can include a unit cell volume V having a particular value. For example, V can be at least 200 cubic Angstroms, at least 210 cubic Angstroms, at least 230 cubic Angstroms, at least 250 cubic Angstroms, or at least 260 cubic Angstroms. In another example, V can be at most 320 cubic Angstroms, at most 310 cubic Angstroms, at most 290 cubic Angstroms, at most 275 cubic Angstroms, or at most 270 cubic Angstroms. In a particular example, V can be in a range including any of the minimum and maximum values noted herein.

In a further aspect, a rhombohedral unit cell can include a normalized volume including a unit volume per formula unit, $V_{N/FU}$, wherein $V_{N/FU}=V/N_{FU}$, wherein $N_{FU}$ represents the number of the formula unit in the unit cell. In a particular aspect, the unit cell can include a particular $V_{N/FU}$. In an example, the halide-based material can include a crystalline structure including a $V_{N/FU}$ of at least 200 cubic Angstroms, at least 210 cubic Angstroms, at least 230 cubic Angstroms, at least 250 cubic Angstroms, or at least 260 cubic Angstroms. In another example, $V_{N/FU}$ can be at most 290 cubic Angstroms, at most 275 cubic Angstroms, at most 270 cubic Angstroms, or at most 268 cubic Angstroms. In a particular example, $V_{N/FU}$ can be in a range including any of the minimum and maximum values noted herein.

In a further aspect, a rhombohedral unit cell can include a normalized volume including a unit volume per halogen atom, $V_{N/AA}$, wherein $V_{N/AA}=V/N_{AA}$ and $N_{AA}$ represents the number of halogen atoms in the unit cell. In a particular aspect, the halide-based material can include a crystalline structure including a particular $V_{N/AA}$. In an example, $V_{N/AA}$ can be at least 30 cubic Angstroms, at least 34 cubic Angstroms, at least 38 cubic Angstroms, at least 42 cubic Angstroms, or at least 46 cubic Angstroms. In another example, $V_{N/AA}$ can be at most 50 cubic Angstroms, at most 48 cubic Angstroms, or at most 47 cubic Angstroms. In a particular example, $V_{N/AA}$ can be in a range including any of the minimum and maximum values noted herein.

Figure 4:
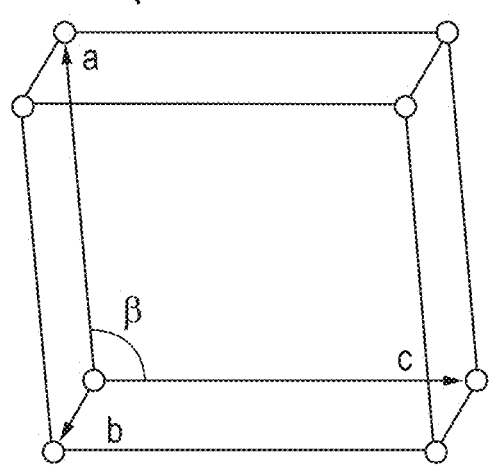
FIG. 4 includes an illustration of another crystalline structure.

In a particular embodiment, the halide-based material can include a crystalline structure represented by a monoclinic space group, wherein the unit cell includes a reduced volume compared to a conventional crystalline structure. Referring to FIG. 4, a monoclinic unit cell 400 is illustrated including parameters a, b, and c, wherein a, b, and c differ from one another. In a particular aspect, the unit cell can be C2/m space group. In an aspect, A, B, and C can independently include a particular value. For example, A can be at least 5.8 Angstroms, at least 6.1 Angstroms, at least 6.3 Angstroms, at least 6.5, at least 6.7, or at least 6.9 Angstroms. In another instance, A can be at most 7.8 Angstroms, at most 7.6 Angstroms, at most 7.3 Angstroms, at most 7.2 Angstroms, or at most 7.0 Angstroms. Moreover, A can be in a range including any of the minimum and maximum values noted herein. In a further example, B can be at least 3.0 Angstroms, at least 3.3 Angstroms, at least 3.6 Angstroms, or at least 3.9 Angstroms. In another instance, B can be at most 4.8 Angstroms, at most 4.6 Angstroms, at most 4.3 Angstroms, at most 4.2 Angstroms, or at most 4.1 Angstroms Moreover, B can be in a range including any of the minimum and maximum values noted herein. In an example, C can be at least 6.1 Angstroms, at least 6.4 Angstroms, or at least 6.8 Angstroms. In another instance, C can be at most 7.9 Angstroms, at most 7.6 Angstroms, at most 7.2 Angstroms, or at most 6.9 Angstroms. Moreover, C can be in a range including any of the minimum and maximum values noted herein.

In a further aspect, the monoclinic unit cell can include a unit cell volume V having a particular value. For example, V can be at least 110 cubic Angstroms, at least 125 cubic Angstroms, at least 140 cubic Angstroms, at least 160 cubic Angstroms, or at least 170 cubic Angstroms. In another example, V can be at most 500 cubic Angstroms, at most 400 cubic Angstroms, at most 310 cubic Angstroms, at most 250 cubic Angstroms, at most 220 cubic Angstroms, at most 200 cubic Angstroms, or at most 180 cubic Angstroms. In a particular example, V can be in a range including any of the minimum and maximum values noted herein.

In a particular aspect, the monoclinic unit cell can include a particular $V_{N/FU}$. In an example, the halide-based material can include a crystalline structure including a $V_{N/FU}$ of at least 200 cubic Angstroms, at least 210 cubic Angstroms, at least 230 cubic Angstroms, at least 250 cubic Angstroms, or at least 260 cubic Angstroms. In another example, $V_{N/FU}$ can be at most 320 cubic Angstroms, at most 300 cubic Angstroms, at most 280 cubic Angstroms, or at most 270 cubic Angstroms. In a particular example, $V_{N/FU}$ can be in a range including any of the minimum and maximum values noted herein.

In a further aspect, a monoclinic unit cell can include a normalized volume including a unit volume per halogen atom, $V_{N/AA}$, wherein $V_{N/AA}=V/N_{AA}$ and $N_{AA}$ represents the number of halogen atoms in the unit cell. In a particular aspect, the halide-based material can include a crystalline structure including a particular $V_{N/AA}$. In an example, $V_{N/AA}$ can be at least 30 cubic Angstroms, at least 34 cubic Angstroms, at least 38 cubic Angstroms, at least 42 cubic Angstroms, or at least 44 cubic Angstroms. In another example, $V_{N/AA}$ can be at most 54 cubic Angstroms, at most 51 cubic Angstroms, at most 49 cubic Angstroms, or at most 47 cubic Angstroms, or at most 45 cubic Angstroms. In a particular example, $V_{N/AA}$ can be in a range including any of the minimum and maximum values noted herein.

A conventional crystalline structure of $Li_3YBr_6$ is represented by C2/m space group and includes per unit cell, 2 formula units, $Li_3YBr_6$, 12 Br atoms, and V of approximately 534 cubic Angstroms. An exemplary $Li_3YBr_6$ of an embodiment can include a crystalline structure represented by R-3m space group and per unit cell, 1 formula unit, 6 Br atoms, and V of approximately 267+/−3% cubic Angstroms. Another exemplary $Li_3YBr_6$ of an embodiment can include a crystalline structure represented by C2/m space group and per unit cell, ⅔ of formula units, 4 Br atoms, and V of approximately 178+/−3% cubic Angstroms.

Figure 5:
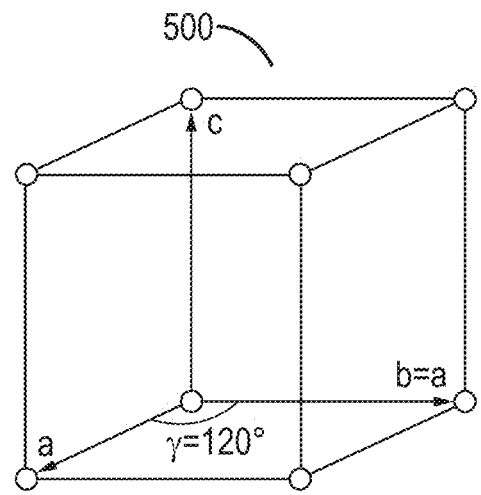
FIG. 5 includes an illustration of different crystalline structures.

In another embodiment, the halide-based material can include a crystalline structure represented by a hexagonal space group, wherein unit cell parameters a and b can be equal. Referring to FIG. 5, the hexagonal unit cell 500 is illustrated including parameters a, b, and c. In an aspect the hexagonal unit cell may be represented by the $P6_3/mcm$ space group. In another aspect the hexagonal unit cell may be represented by the $P6_3/mmc$ space group.

In an aspect, a $P6_3/mcm$ unit cell can include a particular A, B, or C. In an example, A or B or both can be at least 5.0 Angstroms, at least 5.5 Angstroms, at least 6.1 Angstroms, or at least 6.3 Angstroms. In another aspect, A or B or both can be at most 8 Angstroms, or at most 7.5 Angstroms, or at most 7.0 Angstroms, or at most 6.5 Angstroms. Moreover, A, B, or both can be in a range including any of the minimum and maximum values noted herein. In a further aspect, the halide-based material can include a crystalline structure including a particular C. In an example, C can be at least 4.8 Angstroms, at least 5.3 Angstroms, at least 5.7 Angstroms, or at least 6.0 Angstroms. In an example, C can be at most 6.9 Angstroms, at most 6.4 Angstroms, or at most 6.1 Angstroms. In a further example, C can be in a range including any of the minimum and maximum values noted herein.

In a further aspect, the $P6_3/mcm$ unit cell can include a unit cell volume V having a particular value. For example, V is at least 150 cubic Angstroms, at least 170 cubic Angstroms, at least 190 cubic Angstroms, at least 205 cubic Angstroms, or at least 210 cubic Angstroms. In a further example, V can be at most 270 cubic Angstroms, at most 250 cubic Angstroms, at most 230 cubic Angstroms, or at most 220 cubic Angstroms. In a particular example, V can be in a range including any of the minimum and maximum values noted herein.

In a particular aspect, the $P6_3/mcm$ unit cell can include a particular $V_{N/FU}$. In an example, the halide-based material can include a crystalline structure including a $V_{N/FU}$ of at least 150 cubic Angstroms, at least 170 cubic Angstroms, at least 190 cubic Angstroms, at least 200 cubic Angstroms, or at least 210 cubic Angstroms. In another example, $V_{N/FU}$ can be at most 270 cubic Angstroms, at most 250 cubic Angstroms, at most 230 cubic Angstroms, or at most 220 cubic Angstroms. In a particular example, $V_{N/FU}$ can be in a range including any of the minimum and maximum values noted herein.

In a further aspect, a $P6_3/mcm$ unit cell can include a normalized volume including a unit volume per halogen atom, $V_{N/AA}$, wherein $V_{N/AA}=V/N_{AA}$ and $N_{AA}$ represents the number of halogen atoms in the unit cell. In a particular aspect, the halide-based material can include a crystalline structure including a particular $V_{N/AA}$. In an example, $V_{N/AA}$ can be at least 25 cubic Angstroms, at least 28 cubic Angstroms, at least 31 cubic Angstroms, at least 34 cubic Angstroms, or at least 36 cubic Angstroms. In another example, $V_{N/AA}$ can be at most 50 cubic Angstroms, at most 47 cubic Angstroms, at most 44 cubic Angstroms, or at most 41 cubic Angstroms, or at most 38 cubic Angstroms. In a particular example, $V_{N/AA}$ can be in a range including any of the minimum and maximum values noted herein.

In an aspect, a $P6_3/mmc$ unit cell can include a particular A, B, or C. In an example, A or B or both can be at least 2.5 Angstroms, at least 2.8 Angstroms, at least 3.2 Angstroms, or at least 3.6 Angstroms. In another aspect, A or B or both can be at most 5 Angstroms, at most 4.6 Angstroms, at most 4.3 Angstroms, at most 4.1 Angstroms, or at most 3.8 Angstroms. Moreover, A, B, or both can be in a range including any of the minimum and maximum values noted herein. In a further aspect, the halide-based material can include a crystalline structure including a particular C. In an example, C can be at least 4.8 Angstroms, at least 5.3 Angstroms, at least 5.7 Angstroms, or at least 6.0 Angstroms. In an example, C can be at most 6.9 Angstroms, at most 6.4 Angstroms, or at most 6.1 Angstroms. In a further example, C can be in a range including any of the minimum and maximum values noted herein.

In a further aspect, the $P6_3/mmc$ unit cell can include a unit cell volume V having a particular value. For example, V can be at least 60 cubic Angstroms, at least 65 cubic Angstroms, at least 68 cubic Angstroms, or at least 70 cubic Angstroms. In another example, V can be at most 85 cubic Angstroms, at most 82 cubic Angstroms, at most 78 cubic Angstroms, at most 74 cubic Angstroms, or at most 71 cubic Angstroms. In a further example, V can be in a range including any of the minimum and maximum values noted herein.

In a particular aspect, the $P6_3/mmc$ unit cell can include a particular $V_{N/FU}$. In an example, the halide-based material can include a crystalline structure including a $V_{N/FU}$ of at least 150 cubic Angstroms, at least 170 cubic Angstroms, at least 190 cubic Angstroms, at least 200 cubic Angstroms, or at least 210 cubic Angstroms. In another example, $V_{N/FU}$ can be at most 270 cubic Angstroms, at most 250 cubic Angstroms, at most 230 cubic Angstroms, or at most 220 cubic Angstroms. In a particular example, $V_{N/FU}$ can be in a range including any of the minimum and maximum values noted herein.

In a further aspect, a $P6_3/mmc$ unit cell can include a normalized volume including a unit volume per halogen atom, $V_{N/AA}$, wherein $V_{N/AA}=V/N_{AA}$ and $N_{AA}$ represents the number of halogen atoms in the unit cell. In a particular aspect, the halide-based material can include a crystalline structure including a particular $V_{N/AA}$. In an example, $V_{N/AA}$ can be at least 25 cubic Angstroms, at least 28 cubic Angstroms, at least 31 cubic Angstroms, at least 34 cubic Angstroms, or at least 36 cubic Angstroms. In another example, $V_{N/AA}$ can be at most 50 cubic Angstroms, at most 47 cubic Angstroms, at most 44 cubic Angstroms, or at most 41 cubic Angstroms, or at most 38 cubic Angstroms. In a particular example, $V_{N/AA}$ can be in a range including any of the minimum and maximum values noted herein.

A conventional crystalline structure of $Li_3YCl_6$ is represented by Pnma space group and includes per unit cell, 4 formula units, 24 Cl atoms, and V of about 875 cubic Angstroms. Another conventional crystalline structure of $Li_3YCl_6$ is represented by P-3m1 space group and includes per unit cell, 3 formula units, 18 Cl atoms, and V of about 655 cubic Angstroms. An exemplary $Li_3YCl_6$ of an embodiment can include a crystalline structure represented by $P6_3/mcm$ and include per unit cell, 1 formula unit, 6 Cl atoms, and V of 218+/−3% cubic Angstroms. Another exemplary $Li_3YCl_6$ of an embodiment can include a crystalline structure represented by $P6_3/mmc$ space group and per unit cell, ⅓ formula units, 2 Cl atoms, and V of 73+/−3% cubic Angstroms.

In an embodiment, the solid electrolyte material can include a halide-based material including a crystalline structure disorder including atomically disordered vacancy and Me atoms sites, disordered $X_1$ and $X_2$ atoms, wherein $X_1$ and $X_2$ represent two different halogen atoms, disordered vacancy sites and M atoms, disordered M and Me atoms, disordered M, Me, and vacancy atoms, or any combination thereof.

In another embodiment, halide-based material can include a crystalline structure including vacancy and Me atoms, wherein positions of at least some of the vacancy and Me atoms can be disordered in an atomic layer or a linear atomic chain. In an aspect, the halide-based material can include a crystalline structure including an atomic disorder of positions of vacancy and Me atoms, wherein the disorder can be at least 10%, at least 20%, at least 30%, at least 40%, at least 60%, at least 80%, or at least 90%.

The atomic disorder can be determined by Rietveld refinement of X-ray powder diffraction pattern of the halide-based material and more specifically based on the percentage of occupancy of crystallographic sites including sites of M atoms, Me atoms and vacancies. After reading the present application, a skilled artisan can understand the atomic disorder based on the percentage of occupancy of crystallographic sites can be determined on a case-by-case basis following the below steps.

X-ray diffraction (XRD) analysis can be performed on the powder halide-based material, and the XRD pattern can be recorded. Simulated XRD pattern can be fit and matched to the XRD of the halide-based material by refining a set of crystal structure parameters (e.g., parameters of unit cell, atomic vacancies, and other parameters noted in the present application) to get the best fit and determine occupancy of crystallographic sites. The atomic disorder can then be determined based on the occupancy of crystallographic sites.

$Li_3MeBr_6$ is used herein as s an example of the halide-based material. Vacancy in the crystalline structure can be included in the formula, and the halide-based material can be represented by $Li_3Me.^{oct}_2Br_6$. $Li_3MeBr_6$ of embodiments herein can have a crystal structure represented by the R-3m space group. When the occupancy of the Me site is 33.33%, the crystal structure can have a perfect atomic disorder of the positions of octahedral vacancy.$^{oct}$ and Me atoms, i.e., 100% Me-vacancy disorder, as the atomic positions of the vacancy and Me atoms are not distinguishable from the X-ray powder diffraction patterns. Conventional corresponding $Li_3MeBr_6$ can have a crystalline structure represented by the C2/m space group. Briefly turning to FIG. 1B to further aid understanding, as illustrated, co-occupancy of the crystallographic site 160 by Me atoms 130 and vacancy 140 is low (i.e., less than 10%).

As another example, vacancy in the crystalline structure of $Li_3MeCl_6$ can be included in the formula, and the halide-based material may be represented as $Li_3Me.^{oct}_2Cl_6$. $Li_3MeCl_6$ of an embodiment herein can have the crystal structure represented by the $P6_3/mcm$ space group, and when the occupancy of the Me site is 33.33%, the crystal structure can have a perfect atomic disorder of octahedral vacancy.$^{oct}$ and Me positions, i.e., 100% Me-vacancy disorder based on the powder XRD patterns, in which atomic positions of the vacancy and Me atoms are not distinguishable.

As noted in embodiments herein, the halide-based material can have a plurality of phases. The atomic disorder can be determined taking into consideration of the phase concentrations. For example, the halide-based material can include a first crystal phase having a crystal structure represented by a first space group different than the corresponding conventional halide-based material and an atomic disorder of a %, wherein the first crystal phase can have a concentration of b wt % and a second crystal phase having a crystal structure represented by a second space group and an atomic disorder of c %, wherein the second phase has a concentration of d wt %. The second space group can be identical to or different from the corresponding conventional halide-based material. The halide-based material can have an atomic disorder that is a linear total disorder. $D_{LT}$, determined by formula, $D_{LT}$=a %*b %+c %*d %. To further aid understanding, in an example, the first phase can have the concentration of 90% and atomic disorder of 96% and the second phase can have the concentration of 10 wt % and 6% of atomic disorder. The atomic disorder of the halide-based material is $D_{LT}$=90%*96%+10%*6% 87%.

In another embodiment, the halide-based material can include the crystalline structure including a crystallographic site occupied by both an Me atom and a vacancy. In an aspect, the crystallographic site can have a multiplicity of 3. In another aspect, the crystallographic site can be Wycoff site 3a or 3b.

In another embodiment, the halide-based material can include the crystalline structure including a crystallographic site occupied by both Me and M atoms. In an aspect, the atomic disorder can include co-occupancy of atom sites by Y and Li. In a particular aspect, at least 5%, at least 10%, or at least 20% of Y atoms can co-occupy Li sites. In another particular aspect, at most 50%, at most 70%, or at most 90% of Y atom can co-occupy the Li sites. In another particular aspect, the Y atoms present at Li sites can be caused by migration of some Y atoms from one layer to another in the crystal structure. Such atomic disorder can lead to a decrease, such as a slight decrease, in the intensity of the first XRD peak of the halide-based material.

In a particular embodiment, an X-ray diffraction pattern of the halide-based material measured with Cu K-alpha radiation can include an absence of a peak between 16° and 25° 2-theta comparing to corresponding conventional halide-based material. A particular example of such halide-based material can have the chemical composition including Li, Y, and Br (referring to as "LYB" hereinafter). In a particular aspect, the X-ray diffraction pattern can include absence of a plurality of peaks between 16° and 25° 2-theta. In another particular aspect, the X-ray diffraction pattern can be essentially free of a peak between 16° and 25° 2-theta.

It is to be understood that the halide-based material can include an XRD pattern including absence of a peak at a particular range of 2-theta, wherein the range can change when the chemical composition changes. In an embodiment, Me can be partially substituted by another Me metal, and the change of 2-theta range can be in an inverse correlation with the change of a lattice parameter caused by the partial substitution. For example, a lattice parameter of the LYB material noted in the above-embodiment can increase by 5% due to the partial substitution of Y with another Me ion having a larger size, and the absence of XRD peaks can be between 15.2° and 23.75° 2-theta. In another example, a lattice parameter of the LYB material may decrease by 7% due to the partial substitution of Y with another Me ion having a smaller size, and the absence of XRD peaks can be between 17.12° and 26.75° 2-theta. Lattice parameter that can be affected by partial substitution of Me can include A, C, B, or any combination thereof. In instances, A and C can be affected equally. In another instance, A and C may be affected slightly differently.

Referring to FIGS. 1A to 1C, the crystalline structure represented by R-3m includes disordered Me and vacancy sites, as illustrated in FIG. 1A. The octahedral site 160 is occupied by Me atom 130 and vacancy 140. As illustrated, $\frac{1}{3}^{rd}$ of the octahedral 160 is occupied by Me and $\frac{2}{3}^{rd}$ is vacant. This configuration represents a relatively high Me-vacancy disorder. Comparing to conventional C2/m illustrated in FIG. 1B, one Me atom 130 and two vacancies 140 are ordered as the atomic sites 160 are either nearly empty or nearly full, forming a regular or ordered pattern within the empty/vacant (unfilled sphere) and full/occupied (partially filled sphere) sites. This configuration represents low Me-vacancy disorder (i.e., less than 10%). In FIG. 1C, the illustrated C2/m space group unit cell has a smaller volume than the conventional unit cell illustrated in FIG. 1B, and the Me atoms and vacancy occupy the same site, i.e., $\frac{1}{3}^{rd}$ and $\frac{2}{3}^{rd}$ of the same site respectively. This configuration also represents a relatively high Me-vacancy disorder.

Figure 6A:
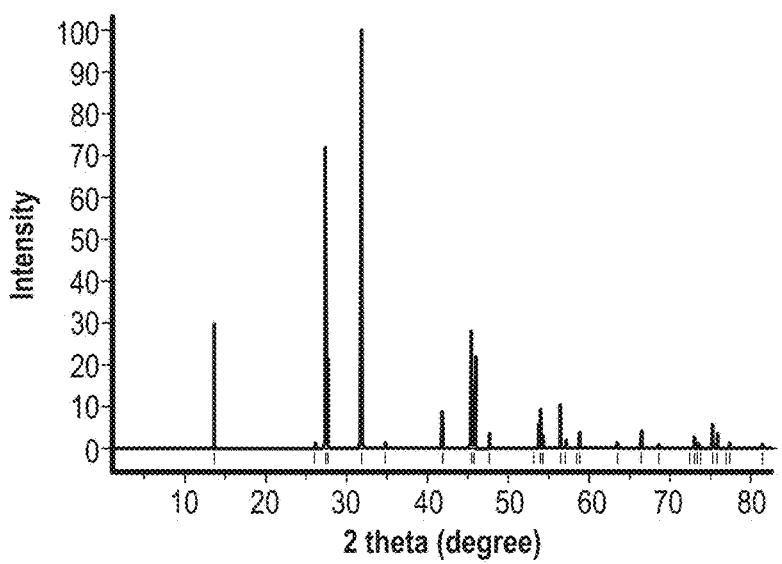
FIGS. 6A to 6C include spectrums of X-ray powder diffraction simulation of halide-based materials.
Figure 6B:
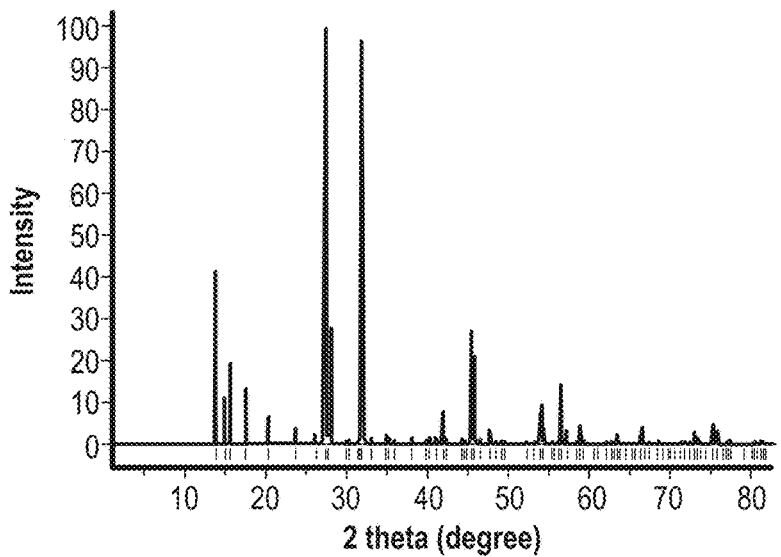
Figure 6C:
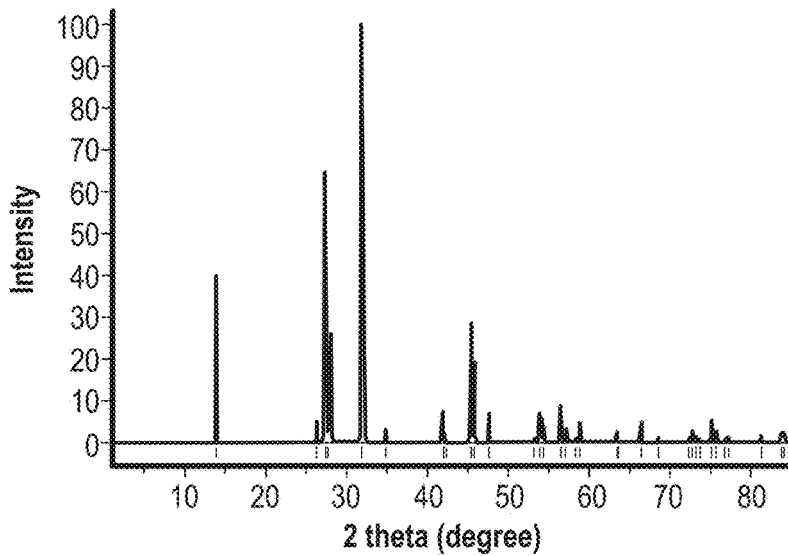

FIG. 6A and FIG. 6B include spectrums of X-ray powder diffraction simulation of lithium yttrium bromide having the crystalline structures illustrated in FIGS. 1A and 1B, respectively. Comparing to the spectrum of FIG. 6B, the spectrum illustrated in FIG. 6A, demonstrates an absence of peaks from 16° to 25° 2-theta, which corresponds to the completely disordered Y and vacancy sites in the crystalline structure of R-3m. Similarly, comparing to the spectrum of FIG. 6B, the spectrum illustrated in FIG. 6C, demonstrates an absence of peaks from 16° to 25° 2-theta, which corresponds to the completely disordered Y and vacancy sites in the crystalline structure represented by C2/m space group having a unit cell approximately 3 times smaller than the conventional monoclinic unit cell.

Figure 7C:
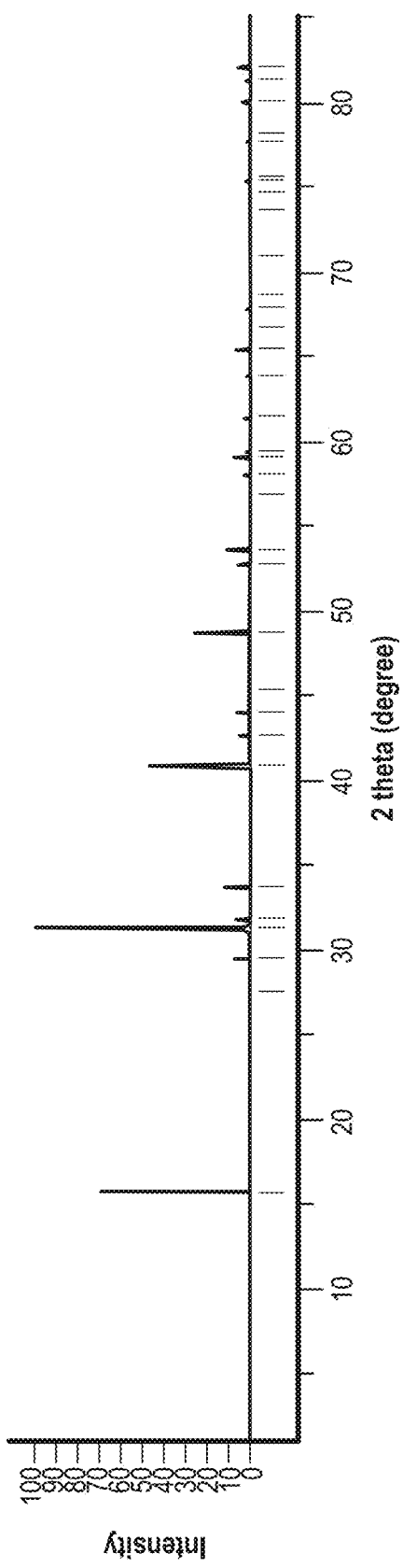

FIGS. 7A to 7E include spectrums of X-ray diffraction simulation of halide-based material including Li, Y, and Cl having different crystalline structures. FIG. 7A includes the simulation spectrum of the halide-based material having the crystalline structure represented by Pnma, as illustrated in FIG. 2A, and FIG. 7B includes the simulation spectrum of the halide-based material having the crystalline structure represented by P-3m1, as illustrated in FIG. 2B. FIG. 7C includes a simulation spectrum of the halide-based material having the crystalline structure represented by space group P6$_3$/mcm, as illustrated in FIG. 2C. Turning to FIGS. 2A to 2C, the crystalline structure represented by Pnma (FIG. 2A) or P-3m1 (FIG. 2B) demonstrates ordered Y and vacancy sites, while the crystalline structure of P6$_3$/mcm (FIG. 2C) includes linear disorder of Y 210 and vacancy 220 sites. The atomic order of the crystal structures 200 and 201 are indicated by the alternate and regularly ordered occurrence of Y 210 and vacancy 220 in the linear chains including octahedra. The atomic disorder in FIG. 2C is illustrated by complete mixing of 50% Y 210 and 50% vacancy 220 in the linear chains 230 including octahedra. In the respective XRD patterns, the linear disorder is demonstrated by the absence of peaks from 16.5° to 27.5° 2-theta in FIG. 7C compared to FIG. 7A and FIG. 7B.

Figure 7D:
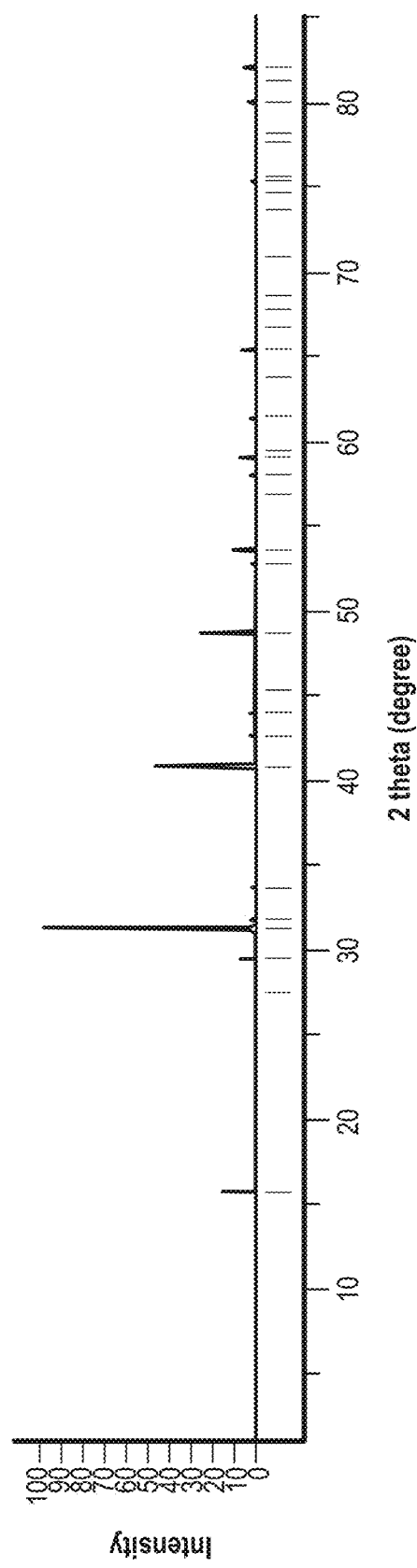
Figure 7E:
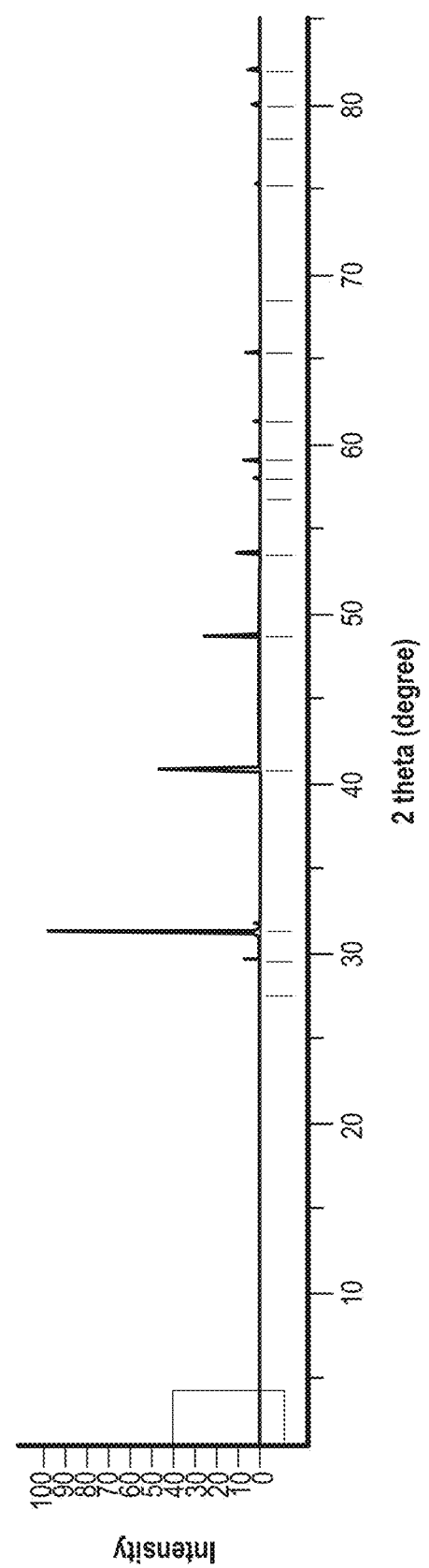

FIG. 7D includes a simulation spectrum of the halide-based material having crystalline structure disorder including partial Y migration into Li channels. In an example, at least 5%, at least 10%, or at least 20% of Y atoms can migrate into Li channels. FIG. 7E includes a simulation spectrum of the halide-based material having the crystalline structure of P6$_3$/mmc. As illustrated in FIG. 2D, further comparing to FIGS. 2A and 2B, the crystalline structure 203 of P6$_3$/mmc includes complete Y intermixing with the Li atoms, as indicated by 240. In a particular example, the halide-based material can be lithium yttrium chloride, and the crystalline structure disorder can include completely intermixed Y and Li sites. Comparing to the spectra illustrated in FIG. 7A and FIG. 7B, spectrums in FIGS. 7C to 7E includes an absence of one or more peaks from 16.5° to 27.5° 2-theta. In particular, the XRD pattern can include a reduction in intensity or complete absence of the first XRD peak near 15.5° 2-theta.

It is worth noting the halide-based material of embodiments herein can have one or more crystalline structure disorders noted in embodiments herein and a particular crystallinity characteristic including an average diffraction crystallite size, micro-strain, a corrected average FWHM, crystallographic density, or any combination thereof. The one or more disorders, one or more particular crystallinity characteristics, or any combination thereof can facilitate improved property of the solid electrolyte material. Such property can include ionic conductivity, mechanical properties such as but not limited to plasticity, conformability, conformity, flexibility, electrochemical stability, chemical stability, thermal stability, electronic resistivity, particle morphology and/or size, electrode wettability, and/or the like, or any combination thereof.

In another embodiment, the solid electrolyte material can include a halide-based material having a particular average diffraction crystallite size. The average diffraction crystallite size can be also referred to as the coherently X-ray scattering domain size and determined using X-ray diffraction analysis of the halide-based material and Schrerrer's equation, $L=(K\lambda)/(\beta \cos \theta)$, wherein L represents the average diffraction crystallite size, wherein K is a dimensionless shape factor, with a value close to unity, and has a typical value from 0.9 to 1; $\lambda$ is the X-ray wavelength; $\beta$ is the line broadening at half the maximum intensity (FWHM), after subtracting the instrumental line broadening, in radians; and $\theta$ is the Bragg angle.

In an aspect, the average diffraction crystallite size can be at least 20 nm, at least 25 nm, at least 30 nm, at least 35 nm, or at least 40 nm. In another aspect the average diffraction crystallite size can be at most 500 nm, at most 400 nm, at most 300 nm, at most 200 nm, or at most 100 nm. In a further aspect, the average diffraction crystallite size can be in a range including any of the minimum and maximum values noted herein.

In a further embodiment, the halide-based material can include micro-strain. Micro-strain $\epsilon$ is a dimensionless parameter detected by X-ray diffraction analysis $\beta=4\epsilon \tan \theta$. In an aspect, the micro-strain can be at most 1%, at most 0.6%, at most 0.35%, at most 0.2%, or at most 0.1%. In another aspect, micro-strain may not be present. In a further aspect, micro-strain may be at least 0.005%, such as at least 0.05%, at least 0.08%, at least 0.1%, or at least 0.2%. Moreover, the halide-based material can include micro-strain in a range including any of the minimum and maximum percentages noted herein.

In a further embodiment, the halide-based material can include a corrected FWHM averaged over a range of diffraction angles 2-theta from 10° to 80° (referred to as "corrected average FWHM"). The corrected average FWHM is intended to refer to an average FWHM corrected for instrument broadening. Instrument broadening can be determined by recording the X-ray diffraction pattern of a highly crystalline standard commercial material LaB$_6$ (supplier: NIST) under the same measurement conditions (geometry, slits, detector, or other hardware and optics parameters of the diffractometer) as the halide-based material to be tested. The peak broadening of the standard material is subtracted from that of the halide-based material to obtain the corrected FWHM as a function of diffraction angle 2-theta. In an aspect, the corrected average FWHM can be less than 1.5%, at most 1.4%, at most 1.2%, at most 1%, at most 0.8%, or at most 0.5%. In another aspect, the halide-based material can include a corrected average FWHM of at least 0.5%, at least 0.8%, or at least 1%. Moreover, the corrected average FWHM can be in a range including any of the minimum and maximum percentages noted herein.

In an embodiment, the halide-based electrolyte material can include a particular crystallographic density determined by X-ray diffraction analysis. The crystallographic density is the density of a unit cell that is given as the ratio of mass and volume of a unit cell. The mass of a unit cell is equal to the product of a number of atoms in a unit cell and the mass of each atom in a unit cell. In an aspect, the halide-based material can have a crystallographic density of at least 95% and up to 100% of the theoretical crystallographic density. In another aspect, the halide-based electrolyte material can include a crystallographic density in a range of 2.0 g/cm$^3$ to 4.2 g/cm$^3$.

In a particular embodiment, the halide-based electrolyte material can include the crystallographic density in a range of 3.0 g/cm$^3$ to 4.2 g/cm$^3$ or 3.4 g/cm$^3$ to 3.9 g/cm$^3$ when X is Br. In another particular embodiment, the halide-based electrolyte material can include the crystallographic density in a range of 2.0 g/cm$^3$ to 3.2 g/cm$^3$ or 2.2 g/cm$^3$ to 2.8 g/cm$^3$ when X is Cl.

Figure 8:
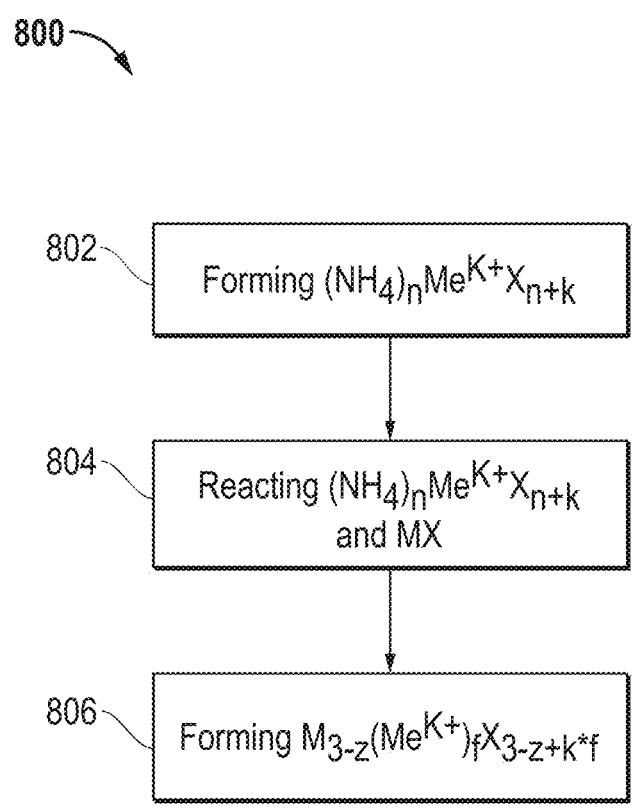
FIG. 8 includes a flowchart illustrating a process of forming a solid electrolyte material according to an embodiment.

FIG. 8 includes an illustration of a process for forming a solid electrolyte material including a halide-based material 800. The process 800 can include forming $(NH_4)_n Me^{k+} X_{n+k}$ at block 802. In exemplary implementations, the process 800 can include forming a reaction mixture including starting materials including ammonium halide, NH4X, one or more Me metal compounds, one or more M metal compounds, or any combination thereof. In particular implementations, the metal compounds may be non-hygroscopic. The metal compounds can be in the form of oxide, carbonate, sulfide, sulfate, hydrate, hydroxide, oxalate, acetate, nitrate, or any combination thereof. In particular instances, the starting material can include $Me_2O_k$. In more particular examples, the starting material can include one or more of rare earth oxide or hydroxide or carbonate, $ZrO_2$ or $Zr(OH)_4$ or $Zr(CO_3)_2$ or $Zr(OH)_2CO_3 \cdot ZrO_2$ or any combination thereof.

In another example, M metal compound can include a carbonate, such as lithium carbonate, sodium carbonate, cesium carbonate, or a combination thereof.

The starting material may further include an acid to facilitate the acidic synthesis in an aqueous, alcohol or other polar molecular liquid solution.

In an instance, the metal compound may consist of M metal compounds. Exemplary M metal compounds can include halide (e.g., NaCl, CsCl, and LiCl).

The starting materials may be mixed at a stoichiometric ratio or to allow the formation of a non-stoichiometric halide-based material.

In a particular exemplary implementation, a reaction mixture may be formed including NH$_4$X, one or more rare earth metal oxide (referred to as "RE$_2$O$_3$" hereinafter), lithium carbonate, and hydrochloric or hydrobromic acid.

In an exemplary implementation, the process 800 can include conducting a reaction between the starting materials. An exemplary reaction is illustrated below noting the starting materials and reaction products in the aqueous solution.

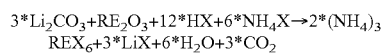

In view of the application, a skilled artisan appreciates a different alkali metal compound, such as Na$_2$CO$_3$ or NaCl, may be used in lieu of or in addition to Li$_2$CO$_3$ or in lieu of RE$_2$O$_3$. Similarly, an oxide of a non-rare earth element, such as MgO or ZrO$_2$, may be added to the reaction. A skilled artisan further appreciates the reaction products may change accordingly as the starting materials change.

In an exemplary implementation, the process 800 can include chemically substituting moisture (i.e., water) in a hydrated salt-containing MeX$_k$ with NH$_4$X. Using the above-illustrated reaction as an example, hydrated rare earth halide may be formed as an intermediate product and the water in the hydrates may be replaced by NH$_4$X to form (NH$_4$)$_3$REX$_6$. As further illustrated, the reaction product mixture includes alkali metal halide, such as LiX.

In an embodiment, the process 800 can include forming a mixture including $(NH_4)_n Me^{k+} X_{n+k}$ and LiX. In a particular aspect, the process 800 can include forming an intimate mixture including $(NH_4)_n Me^{k+} X_{n+k}$ and LiX.

In an instance, the reaction product mixture may be filtered to remove larger particles to facilitate the subsequent reaction in the solid-state. Larger particles can include impurities that come with any of the starting materials, remaining particles of the starting materials, carbon, or any combination thereof.

The process 800 can continue to block 804. In an exemplary implementation, the mixture of the reaction products can be dried to facilitate the solid-state reaction of $(NH_4)_n Me^{k+} X_{n+k}$ and alkali metal halide, MX. Drying may be performed in air or dry air and/or under vacuum or reduced pressure, such as 100 mbar, 40 mbar, 1 mbar, or even 0.01 mbar. In some instances, N$_2$ or Ar flow may be used to facilitate the removal of water. In another example, heat may be applied to aid the evaporation of water. The heating temperature can be from 100° C. to 160° C. Drying may be conducted until a trace amount of water is left in the mixture, such as from 1 wt % to 3 wt %.

In an exemplary implementation, the process 800 can include performing a solid-state reaction of $(NH_4)_n Me^{k+} X_{n+k}$ and MX. In a particular example, continuing the reaction using the above-illustrated reaction products, the solid-state reaction of $(NH_4)_3REX_6$ and LiX may be performed forming $(NH_4)_n M_{3-z} Me^{k+} X_{3+n+k-z}$. In a further instance, the process 100 can include forming $(NH_4)_n M_{3-z} (Me^{k+})_f X_{3+n-z+k*f}$.

The process 800 can continue to block 806, forming $M_{3-z}(Me^{k+})_f X_{3-z+k*f}$. In an exemplary implementation, the process 800 can include decomposing ammonium halide. In an exemplary implementation, the solid-state solution may be heated to a temperature in a range from at least 150° C. to at most 800° C. to allow sublimation of ammonium halide. The heating temperature can be selected based on the composition of the halide-based material. For example, for a halide-based material that is relatively volatile, the heating temperature can be relatively low. In another example, the heating temperature may be at least 150° C. lower than the melting temperature, and/or at most 50° C. above the melting temperature. Heating may be carried out in a crucible made of a material that is inert to the reactants and products. For example, the crucible may be made of quartz, alumina, silica-alumina, BN, glassy carbon, or graphite. In particular implementations, graphite can have a pyrolytic carbon coating. Heating may be conducted in a dry and neutral atmosphere, such as air or dry air. An inert gas, such as N$_2$ or Ar, may be used to facilitate the process. Heating may be performed for at least 15 minutes to at most 12 hours.

In an exemplary implementation, sublimation of $NH_4X$ can be monitored by collecting and weighing the escaped $NH_4X$. In a particular example, the sublimation can be complete such that the halide-based material can be essentially free of $NH_4X$. In another particular example, an amount of $NH_4X$ can remain in the halide-based material.

In an exemplary implementation, after decomposition of $NH_4X$, cooling may be performed. For example, cooling may be performed in air, dry air, or a nitrogen atmosphere. In another example, cooling temperature may be below 200° C., such as at most 100° C., at most 70° C., at most 50° C., or at most 30° C., or at room temperature (e.g., 20 to 25° C.). Optionally, Ar or $N_2$ may be used to facilitate cooling.

In an embodiment, cooling may be performed at a particular cooling rate that can facilitate the formation of the halide-based material. In an example, the cooling rate can be from 10 to 100° C./min.

It is noted temperature cycles should be carefully controlled for the formation of halide-based material including higher contents stacking faults. For example, non-monotonic cooling down or unintentional annealing can cause a decrease in contents of stacking faults. Unintentional annealing can be annealing at temperatures less than 0.7 Tm, wherein Tm is the melting point of the halide-based material in Kelvin for a duration of more than 10 minutes.

It is further noted care should be taken to carefully control the number of oxygen-containing species (e.g., oxides, hydroxides, and/or moisture) that can be present in the process of forming the halide-based material. Oxygen-containing species in excess can cause the formation of impurity phases that can reduce certain performance of a battery component formed using the halide-based material, such as ionic conductivity. For instance, the solid-state reaction or melt reaction can be carried out under a neutral atmosphere with a limited content of moisture or oxygen level lower than 10 ppm. In a further example, the initial amount of halide compounds, such as acids or ammonium halides, may be higher than the stoichiometric amount based on the theoretical chemical balance equation (such as at least 10% more) to ensure the yield of complex halide materials and reduce the level of oxygen-containing phases originated from metal oxide or metal carbonate raw materials to below the detectable level by XRD.

In another embodiment, the halide-based material can include an improved ionic conductivity. The ionic conductivity can be measured at room temperature (i.e., 20° C. to 25° C.). In an aspect, the ionic conductivity can be at least 0.001 mS/cm, at least 0.01 mS/cm, at least 0.1 mS/cm, at least 0.4 mS/cm, at least 0.8 mS/cm, at least 1.2 mS/cm, at least 1.8 mS/cm, or at least 2.2 mS/cm. In another aspect, the ionic conductivity can be at most 15 mS/cm, at most 13 mS/cm, at most 11 mS/cm, 8 mS/cm, at most 7.2 mS/cm, or at most 6.2 mS/cm. Moreover, the solid electrolyte can include a halide-based material having an ionic conductivity in a range including any of the minimum and maximum values noted herein. In an embodiment, the ionic conductivity may be mainly in bulk.

In an embodiment, the halide-based material can include improved purity compared to a corresponding conventional halide-based material. A corresponding conventional halide-based material is intended to refer to a halide-based material that may be represented by the same formula as a halide-based material noted in embodiments herein but formed by a process different than the process described in embodiments herein. In an embodiment, the halide-based material may include certain content of impurity. For example, an impurity may include a by-product formed by the process of forming the halide-based material, or any combination thereof. Impurity may be present as a different phase than the complex compound of the halide-based material. A skilled artisan will appreciate when an impurity is at a relatively higher content (i.e., at least 0.3 wt %), the impurity phase may be detected by an X-ray diffraction analysis of the halide-based material. For instance, a characteristic peak of the impurity phase may be present in the spectrum of the halide-based material. In a further example, impurity may include a binary halide (e.g., LiCl, LiBr, $YCl_3$, and/or $YBr_3$), oxyhalide (e.g., YOCl and/or YOBr), a nitride, or any combination thereof.

In an embodiment, the halide-based material may include a particular total content of all impurity that may facilitate improved property and/or crystalline characteristics of the halide-based material. In an aspect, the total content of all impurity may make up at most 15 wt % for the weight of the halide-based material of embodiments herein. For example, the total content of impurity may be at most 14 wt % for the weight of the complex metal halide, such as at most 13 wt %, at most 12 wt %, at most 11 wt %, at most 10 wt %, at most 9 wt %, at most 8 wt %, at most 7 wt %, at most 6 wt %, at most 5 wt %, at most 4 wt %, at most 3 wt %, at most 2 wt %, at most 1 wt %, at most 0.5 wt %, at most 0.3 wt %, at most 0.1 wt %, at most 500 ppm, at most 300 ppm, at most 100 ppm, at most 50 ppm, at most 40 ppm, at most 30 ppm, at most 20 ppm, or at most 10 ppm for the weight of the complex metal halide. In another aspect, the halide-based material may include a total content of impurity of at least 0.2 ppm for the weight of the halide-based material, such as at least 0.5 ppm, at least 1 ppm, or at least 2 ppm for the weight of the halide-based material. In another aspect, the total content of impurity may be in a range including any of the minimum or maximum values noted herein.

The content of an impurity phase may be determined by XRD analysis coupled with Rietveld refinements for quantitative analysis through the presence of characteristic diffraction peaks corresponding to the parasitic phases. Rietveld Refinements (RR) can analyze the shape and position of the peaks at an XRD diagram to identify quantitatively the contribution of the various phases by collecting the 2θ data at XRD diffraction with a small incrementation of 2θ angles and converting the XRD data into a ratio of different phases.

For a nitride-based impurity phase, LECO analysis may also be used to determine the presence and quantify the phase, particularly when the nitride-based impurity phase is present at below 0.1% at the molar or mass quantity. LECO analysis is based on combustion of the sample and analyzing the presence of nitrogen (or also sulfur, carbon, hydrogen, oxygen) through boiled material gas thermal conductivity or Infra-Red absorption diagrams.

In particular embodiments, the halide-based material may include a low level of an impurity phase, wherein the impurity phase may not be detected by powder XRD analysis. For instance, a characteristic peak of the impurity phase may not be identifiable in the spectrum of the halide-based material. A skilled artisan will appreciate powder XRD can be carried out using a state-of-the-art diffractometer, such as, Rigaku SmartLab or Bruker D2 PHASER.

In an embodiment, impurity may include a nitride-based compound including metal nitride, metal oxynitride, metal-carbon nitride, or any combination thereof. In a further embodiment, the halide-based material may include a particular total content of nitride-based impurity phase that may facilitate improved property and/or crystalline characteristics of the halide-based material. In an aspect, the total content of nitride-based impurity phase can be at most 0.5 wt % for the weight of the halide-based material, such as at most 0.3 wt %, at most 0.2 wt %, at most 0.1 wt %, at most 500 ppm, at most 300 ppm, at most 100 ppm, at most 50 ppm, at most 40 ppm, at most 30 ppm, at most 20 ppm, or at most 10 ppm for the weight of the complex metal halide. In another aspect, the total content of a nitride-based impurity phase can be at least 0.2 ppm for the weight of the complex metal halide, such as at least 0.5 ppm, at least 1 ppm, or at least 2 ppm for the weight of the complex metal halide. In a further aspect, the total content of a nitride-based impurity phase may be in a range including any of the minimum or maximum values noted herein.

In an embodiment, the halide-based material may include impurity including alkali metal halide (MX). A particular example of MX may include LiCl, LiBr, NaCl, CsCl, NaBr, CsBr, or any combination thereof. In another embodiment, the halide-based material may include a particular content of MX that may facilitate improved property and/or crystalline characteristics of the halide-based material. In an aspect, a total content of MX phase can be at most 10 wt % for the weight of the halide-based material, such as at most 9 wt %, at most 8 wt %, at most 7 wt %, at most 6 wt %, at most 5 wt %, at most 4 wt %, at most 3 wt %, at most 2 wt %, at most 1 wt %, at most 0.5 wt %, at most 0.3 wt %, at most 0.2 wt %, at most 0.1 wt %, at most 500 ppm, at most 300 ppm, at most 100 ppm, at most 50 ppm, at most 40 ppm, at most 30 ppm, at most 20 ppm, or at most 10 ppm for the weight of the halide-based material. In another aspect, the total content of MX phase can be at least 0.2 ppm for the weight of the halide-based material, such as at least 0.5 ppm, at least 1 ppm, or at least 2 ppm for the weight of the halide-based material. In another aspect, the total content of MX phase may be in a range including any of the minimum or maximum values noted herein.

In an embodiment, the halide-based material may include impurity including metal oxyhalide (MeOX). An example of MeOX may include rare earth oxyhalide. In a further embodiment, the halide-based material may include a total content of MeOX that may facilitate improved property and/or crystalline characteristics of the halide-based material. In an aspect, the total content of MeOX may be at most 5 wt % for the weight of the complex metal halide, such as at most 4 wt %, at most 3 wt %, at most 2 wt %, at most 1 wt %, at most 0.5 wt %, at most 0.3 wt %, at most 0.2 wt %, at most 0.1 wt %, at most 500 ppm, at most 300 ppm, at most 100 ppm, at most 50 ppm, at most 40 ppm, at most 30 ppm, at most 20 ppm, or at most 10 ppm for the weight of the halide-based material. In another aspect, the content of MeOX phase can be at least 0.2 ppm for the weight of the complex metal halide, such as at least 0.5 ppm, at least 1 ppm, or at least 2 ppm for the weight of the halide-based material. In another aspect, the total content of MeOX phase may be in a range including any of the minimum or maximum values noted herein. In particular aspects, the halide-based material can be essentially free of MeOX.

In an embodiment, the halide-based material may include impurity including metal nitride, $Me_xN_k$. An example of $Me_xN_k$ may include rare earth nitride. In a further embodiment, the halide-based material may include a particular total content of $Me_xN_k$ phase that may facilitate improved property and/or crystalline characteristics of the halide-based material. In an aspect, the total content of $Me_xN_k$ can be at most 0.3 wt % for the weight of the halide-based material, such as at most 0.1 wt %, at most 500 ppm, at most 300 ppm, at most 100 ppm, at most 50 ppm, at most 40 ppm, at most 30 ppm, at most 20 ppm, or at most 10 ppm for the weight of the halide-based material. In another aspect, the content of $Me_xN_k$ phase can be at least 0.2 ppm for the weight of the halide-based material, such as at least 0.5 ppm, at least 1 ppm, or at least 2 ppm for the weight of the halide-based material. In another aspect, the total content of $Me_xN_k$ phase may be in a range including any of the minimum or maximum values noted herein.

In an embodiment, the halide-based material may include impurity including metal nitride, $M_xN$. An example of $M_xN$ may include alkali metal nitride. In a further embodiment, the halide-based material may include a particular total content of $M_xN$ phase that may facilitate improved property and/or crystalline characteristics of the halide-based material. In an aspect, the total content of metal nitride $M_xN$ can be at most 0.3 wt % for the weight of the halide-based material, such as at most 0.1 wt %, at most 500 ppm, at most 300 ppm, at most 100 ppm, at most 50 ppm, at most 40 ppm, at most 30 ppm, at most 20 ppm, or at most 10 ppm for the weight of the halide-based material. In another aspect, the total content of $M_xN$ can be at least 0.2 ppm for the weight of the halide-based material, such as at least 0.5 ppm, at least 1 ppm, or at least 2 ppm for the weight of the halide-based material. In another aspect, the total content of $M_xN$ may be in a range including any of the minimum or maximum values noted herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A solid electrolyte material, comprising: $M_{3-z}(Me^{k+})_fX_{3-z+k*f}$, wherein $-3 \leq z < 3$; $2 \leq k < 6$; $0 \leq f \leq 1$; M comprises an alkali metal element; Me comprises a divalent metal element, a trivalent metal element, a tetravalent metal element, a pentavalent metal element, a hexavalent metal element, or any combination thereof; and X comprises a halogen; and
a crystalline structure including stacking faults of at least 20%.

Embodiment 2. The solid electrolyte material of embodiment 1, wherein the crystalline structure is represented by C2/m space group.

Embodiment 3. A solid electrolyte material, comprising $M_{3-z}(Me^{k+})_fX_{3-z+k*f}$, wherein $-3 \leq z < 3$; $2 \leq k < 6$; $0 \leq f \leq 1$; M comprises an alkali metal element; Me comprises a divalent metal element, a trivalent metal element, a tetravalent metal element, a pentavalent metal element, a hexavalent metal element, or any combination thereof; and X comprises a halogen; and
a crystalline structure represented by a rhombohedral space group.

Embodiment 4. The solid electrolyte material of embodiment 3, comprising a crystalline phase comprising a crystalline structure represented by R-3m space group.

Embodiment 5. The solid electrolyte material of any one of embodiments 3 to 4, wherein the solid electrolyte material consists essentially of the crystalline phase comprising the crystalline structure represented by R-3m space group.

Embodiment 6. A solid electrolyte material, comprising: $M_{3-z}(Me^{k+})_fX_{3-z+k*f}$, wherein $-3 \leq z < 3$; $2 \leq k < 6$; $0 \leq f \leq 1$; M comprises an alkali metal element; Me comprises a divalent metal element, a trivalent metal element, a tetravalent metal element, a pentavalent metal element, a hexavalent metal element, or any combination thereof; and X comprises a halogen; and a crystalline structure represented by a hexagonal space group.

Embodiment 7. The solid electrolyte of embodiment 6, comprising a crystalline phase comprising a crystalline structure represented by P6$_3$/mcm or P6$_3$/mmc space group.

Embodiment 8. The solid electrolyte material of embodiment 6 or 7, wherein the solid electrolyte material consists essentially of the crystalline phase comprising the crystalline structure represented by P6$_3$/mcm or P6$_3$/mmc space group.

Embodiment 9. The solid electrolyte material of embodiment 1, 3, or 6, comprising a crystalline phase comprising a crystalline structure represented by P-3m1 or Pnma space group.

Embodiment 10. The solid electrolyte material of embodiment 9, wherein the crystalline phase comprising the crystalline structure represented by P-3m1 or Pnma space groups is at a concentration of at most 70 wt %, at most 50 wt %, at most 25 wt %, at most 15 wt %, at most 8 wt %, or at most 5 wt %.

Embodiment 11. The solid electrolyte material of embodiment 9 or 10, wherein the crystalline phase comprising the crystalline structure represented by P-3m1 or Pnma space groups is at a concentration of at least 1 wt %, at least 4 wt %, at least 10 wt %, at least 25 wt %, at least 50 wt %, or at least 70 wt %.

Embodiment 12. A solid electrolyte material, comprising: $M_{3-z}(Me^{k+})_fX_{3-z+k*f}$, wherein $-3 \leq z < 3$; $2 \leq k < 6$; $0 \leq f \leq 1$; M comprises an alkali metal element; Me comprises a divalent metal element, a trivalent metal element, a tetravalent metal element, a pentavalent metal element, a hexavalent metal element, or any combination thereof; and X comprises a halogen; and a crystalline structure represented by a monoclinic space group having a unit cell containing between 3 and 5 halide atoms.

Embodiment 13. The solid electrolyte material of any one of embodiments 1, 3, 6, and 12, comprising a crystalline phase comprising a crystalline structure represented by C2/m space group.

Embodiment 14. The solid electrolyte material of embodiment 13, wherein crystalline phase comprising the crystalline structure represented by C2/m space group is at a concentration of at most 70 wt %, at most 50 wt %, at most 25 wt %, at most 15 wt %, at most 8 wt %, or at most 5 wt %.

Embodiment 15. The solid electrolyte material of embodiment 13 or 14, wherein the crystalline phase comprising the crystalline structure represented by C2/m space group is at a concentration of at least 1 wt %, at least 4 wt %, at least 10 wt %, at least 25 wt %, at least 50 wt %, or at least 70 wt %.

Embodiment 16. The solid electrolyte material of any one of embodiments 1 to 15, comprising a layered atomic arrangement.

Embodiment 17. The solid electrolyte material of any one of embodiments 3 to 8, wherein A represents a value of unit cell parameter a, and B represents a value of unit cell parameter b, and wherein A=B.

Embodiment 18. The solid electrolyte material of any one of embodiments 3 to 5 and 17, wherein A represents a value of unit cell parameter a, and B represents a value of unit cell parameter b, wherein A or B or both is at least 3.0 Angstroms, or at least 3.3 Angstroms, or at least 3.6 Angstroms, or at least 3.9 Angstroms.

Embodiment 19. The solid electrolyte material of any one of embodiments 3 to 5, 17 and 18, wherein A or B or both is at most 4.8 Angstroms, or at most 4.6 Angstroms, or at most 4.3 Angstroms, or at most 4.2 Angstroms, or at most 4.0 Angstroms.

Embodiment 20. The solid electrolyte material of any one of embodiments 3 to 5 and 17 to 19, wherein C represents a value of unit cell parameter c, wherein C is at least 17 Angstroms, at least 18 Angstroms, or at least 19 Angstroms.

Embodiment 21. The solid electrolyte material of any one of embodiments 3 to 5 and 17 to 20, wherein C is at most 21 Angstroms, at most 20.2 Angstroms, or at most 19.5 Angstroms.

Embodiment 22. The solid electrolyte material of any one of embodiments 6 to 8, wherein A represents a value of unit cell parameter a, and B represents a value of unit cell parameter b, wherein A or B or both is at least 5.0 Angstroms, or at least 5.5 Angstroms, or at least 6.1 Angstroms, or at least 6.3 Angstroms.

Embodiment 23. The solid electrolyte material of any one of embodiment 6 to 8 and 22, wherein A or B or both is at most 8 Angstroms, or at most 7.5 Angstroms, or at most 7.0 Angstroms, or at most 6.5 Angstroms.

Embodiment 24. The solid electrolyte material of any one of embodiments 6 to 8, 22 and 23, wherein C represents a value of unit cell parameter c, wherein C is at least 4.8 Angstroms, at least 5.3 Angstroms, at least 5.7 Angstroms, or at least 6.0 Angstroms.

Embodiment 25. The solid electrolyte material of any one of embodiments 6 to 8 and 22 to 24, wherein C is at most 6.9 Angstroms, at most 6.4 Angstroms, or at most 6.1 Angstroms.

Embodiment 26. The solid electrolyte material of any one of embodiments 3 to 8, comprising a unit cell volume, V, wherein V is at least 200 cubic Angstroms, at least 210 cubic Angstroms, at least 230 cubic Angstroms, at least 250 cubic Angstroms, at least 260 cubic Angstroms.

Embodiment 27. The solid electrolyte material of any one of embodiments 3 to 8, comprising a unit cell volume, V, wherein V is at most 290 cubic Angstroms, at most 275 cubic Angstroms, at most 250 cubic Angstroms, at most 230 cubic Angstroms, or at most 220 cubic Angstroms.

Embodiment 28. The solid electrolyte material of any one of embodiments 1 to 27, comprising formula unit, FU, and a unit cell volume normalized per FU, $V_{N/FU}$, wherein $V_{N/FU}=V/FU$, and wherein $V_{N/FU}$ is at least 200 cubic Angstroms, at least 210 cubic Angstroms, at least 230 cubic Angstroms, or at least 250 cubic Angstroms.

Embodiment 29. The solid electrolyte material of any one of embodiments 1 to 28, comprising formula unit, FU, and a unit cell volume normalized per FU, $V_{N/FU}$, wherein $V_{N/FU}=V/N_FU$, and $N_FU$ represents a number of the formula unit, and wherein $V_{N/FU}$ is at most 290 cubic Angstroms, at most 275 cubic Angstroms, at most 270 cubic Angstroms, or at most 268 cubic Angstroms.

Embodiment 30. The solid electrolyte material of any one of embodiments 1 to 29, comprising a unit cell volume normalized per atom of the halogen, $V_{N/AA}$, wherein $V_{N/AA}=V/AA$ and AA represents, wherein $V_{N/AA}$ is at least 30 cubic Angstroms, at least 34 cubic Angstroms, at least 38 cubic Angstroms, or at least 42 cubic Angstroms.

Embodiment 31. The solid electrolyte material of any one of embodiments 1 to 30, comprising a unit cell volume normalized per atom of the halogen, $V_{N/AA}$, wherein $V_{N/AA}=V/AA$ and AA represents, wherein $V_{N/AA}$ is at most 50 cubic Angstroms, at most 46 cubic Angstroms, at most 42 cubic Angstroms, at most 38 cubic Angstroms.

Embodiment 32. The solid electrolyte material of any one of embodiments 1 to 31, comprising an average diffraction crystallite size of at least 20 nm, at least 25 nm, at least 30 nm, at least 35 nm, or at least 40 nm.

Embodiment 33. The solid electrolyte material of any one of embodiments 1 to 32, comprising an average diffraction crystallite size of at most 500 nm, at most 400 nm, at most 300 nm, at most 200 nm, or at most 100 nm.

Embodiment 34. The solid electrolyte material of any one of embodiments 1 to 33, comprising a micro-strain of at most 1%, at most 0.6%, at most 0.35%, at most 0.2%, or at most 0.1%.

Embodiment 35. The solid electrolyte material of any one of embodiments 1 to 34, comprising a corrected average FWHM of less than 1.5%, at most 1.4%, at most 1.2%, at most 1%, at most 0.8%, or at most 0.5%.

Embodiment 36. The solid electrolyte material of any one of embodiments 1 to 35, comprising a corrected average FWHM of at least 0.5%, at least 0.8%, or at least 1.

Embodiment 37. The solid electrolyte material of any one of embodiments 1 to 36, comprising a crystallographic density in a range of 2.0 g/cm$^3$ to 4.2 g/cm$^3$.

Embodiment 38. The solid electrolyte material of embodiment 37, wherein:
when X is Br, the solid electrolyte material comprises the crystallographic density in a range of 3.0 g/cm$^3$ to 4.2 g/cm$^3$ or 3.4 g/cm$^3$ to 3.9 g/cm$^3$; or
when X is Cl, the solid electrolyte material comprises the crystallographic density in a range of 2.0 g/cm$^3$ to 3.2 g/cm$^3$ or 2.2 g/cm$^3$ to 2.8 g/cm$^3$.

Embodiment 39. The solid electrolyte material of any one of embodiments 1 to 38, wherein the crystalline structure comprises:
atomically disordered vacancy and Me atoms;
disordered X1 and X2 atoms, wherein X1 and X2 represent two different halogen atoms;
disordered vacancy sites and M atoms;
disordered M and Me atoms;
disordered M, Me, and vacancy atoms; or
any combination thereof.

Embodiment 40. The solid electrolyte material of embodiment 39, wherein the atomically disordered vacancy and Me atoms are partially disordered in an atomic layer or a linear atomic chain.

Embodiment 41. The solid electrolyte material of any one of embodiments 1 to 9 and 20, comprising an atomic disorder of at least 10%, at least 20%, at least 30%, at least 40%, at least 60%, at least 80%, or at least 90%.

Embodiment 42. The solid electrolyte material of any one of embodiments 1 to 41, wherein the crystalline structure comprises a crystallographic site occupied by both an Me atom and a vacancy.

Embodiment 43. The solid electrolyte material of embodiment 42, wherein the crystallographic site has a multiplicity of 3.

Embodiment 44. The solid electrolyte material of embodiment 42 or 43, wherein the crystallographic site is Wycoff site 3a or 3b.

Embodiment 45. The solid electrolyte material of any one of embodiments 1 to 44, wherein X-ray diffraction pattern measured with Cu K-alpha radiation includes an absence of a peak between 16° and 25° 2-theta.

Embodiment 46. The solid electrolyte material of any one of embodiments 1 to 45, wherein M comprises at least one of Li or Na.

Embodiment 47. The solid electrolyte material of any one of embodiments 1 to 46, wherein M comprises Li.

Embodiment 48. The solid electrolyte material of any one of embodiments 1 to 47, wherein Me comprises an alkaline earth metal element, 3d transition metal, Mg, Ca, Ba, Zn, Zr, Hf, Ti, Sn, Th, Ge, V, Ta, Nb, Mo, W, Sb, In, Bi, Al, Ga, or any combination thereof.

Embodiment 49. The solid electrolyte material of any one of embodiments 1 to 48, wherein Me comprises a rare earth element, Zr, Sn, or any combination thereof.

Embodiment 50. The solid electrolyte material of any one of embodiments 1 to 49, wherein Me comprises Y, Ce, Gd, Er, Zr, La, Yb, In, Mg, Zn, Sn or any combination thereof.

Embodiment 51. The solid electrolyte material of any one of embodiments 1 to 50, wherein Me comprises Y.

Embodiment 52. The solid electrolyte material of any one of embodiments 1 to 51, wherein X comprises F, Cl, Br, I, or any combination thereof.

Embodiment 53. The solid electrolyte material of any one of embodiments 1 to 52, wherein X comprises Cl, Br, or a combination thereof.

Embodiment 54. The solid electrolyte material of any one of embodiments 1 to 53, wherein X comprises Br.

Embodiment 55. The solid electrolyte material of any one of embodiments 1 to 54, wherein the solid electrolyte material consists of Li, Y, Cl, and Br.

Embodiment 56. The solid electrolyte material of any one of embodiments 1 to 55, wherein the crystalline structure comprises at least 20% stacking faults, at least 30%, at least 40%, at least 50%, at least 60%, at least 70%, at least 80%, or at least 90% stacking faults.

Embodiment 57. The solid electrolyte material of any one of embodiments 1 to 56, comprising an ionic conductivity of at least 0.001 mS/cm, at least 0.01 mS/cm, at least 0.1 mS/cm, at least 0.4 mS/cm, at least 0.8 mS/cm, at least 1.2 mS/cm, at least 1.8 mS/cm, or at least 2.2 mS/cm.

Embodiment 58. The solid ion conductive material of any one of embodiments 1 to 38, comprising an ionic conductivity of at most 15 mS/cm, at most 13 mS/cm, at most 11 mS/cm, at most 8 mS/cm, at most 7.2 mS/cm, or at most 6.2 mS/cm.

EXAMPLES

Example 1

Representative lithium yttrium bromide samples ($Li_3YBr_6$) were formed using the process described in embodiments herein. Decomposition of $NH_4Br$ was performed at 400° C. to 600° C. The samples were further milled in automatic agate mortar-pestle to obtain finer powder particles. Energetic ball-milling was not used. Crystalline structure and crystallinity characteristics of the finally formed particles are included in Table 1 below.

TABLE 1

| Samples | Space group | unit cell parameters a = b (Å) | unit cell parameters c (Å) | unit cell volume V (Å$^3$) | Average crystallite size from XRD (nm) |
| --- | --- | --- | --- | --- | --- |
| 1-1 | R-3 m | 3.991 | 19.338 | 266.8 | 45 |
| 1-2 | (rhombohedral) | 3.999 | 19.375 | 268.3 | 55 |
| 1-3 | | 3.992 | 19.341 | 267.0 | 51 |

Example 2

Figure 9:
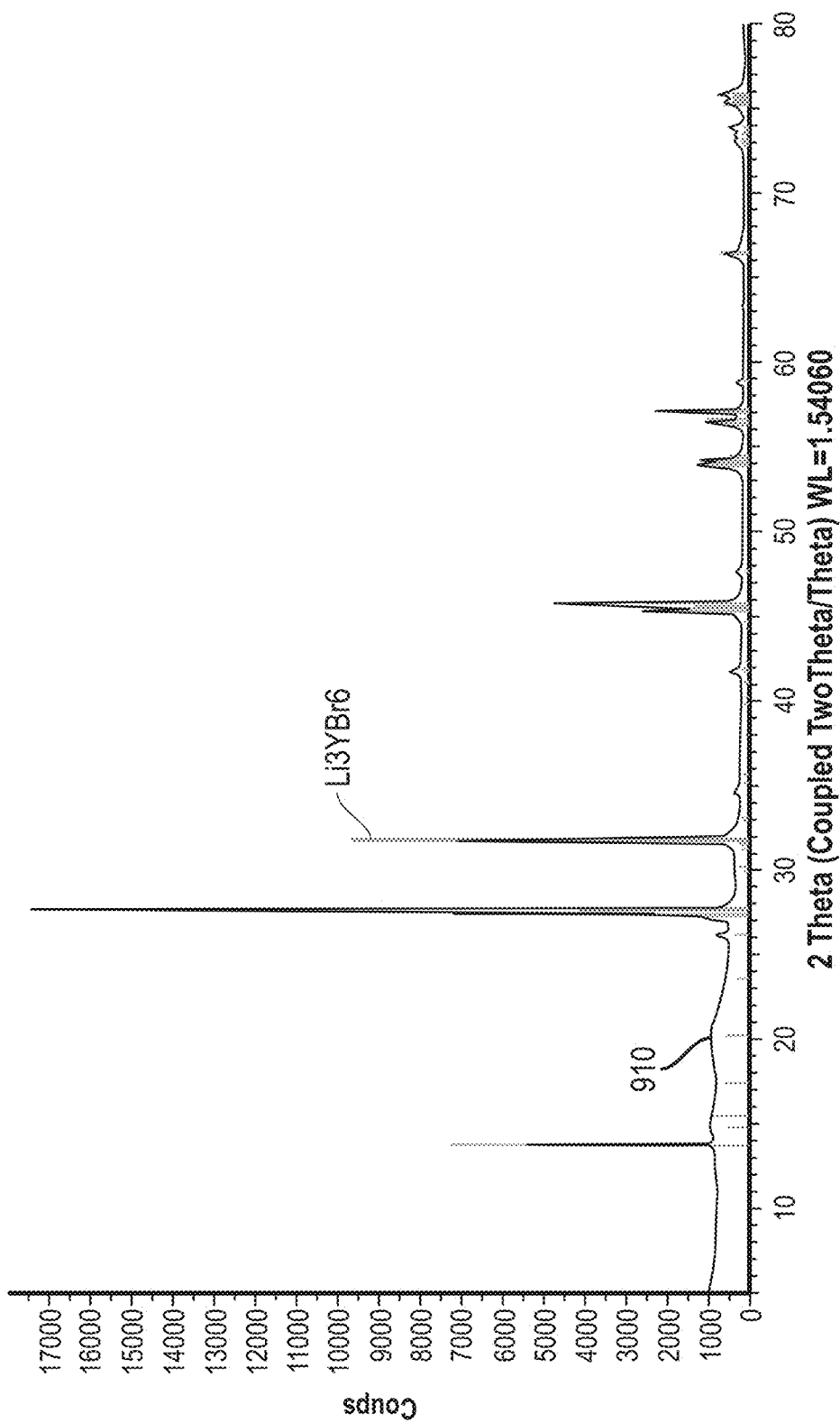
FIG. 9 includes an illustration including an X-ray diffraction pattern of a halide-based electrolyte material.

Representative $Li_3YBr_6$ sample was formed using the process described in embodiments herein. FIG. 9 includes an X-ray diffraction spectrum recorded with Cu K-alpha radiation. Curve 910 represents the X-ray diffraction pattern of the sample, and bars are included where the expected peaks for the conventional crystalline structure are. The sample demonstrates no peaks between 16° and 25° 2-theta.

Example 3

Representative $Li_3YBr_6$ sample was formed using the process described in embodiments herein. FIG. 10 includes the structural model of the sample. The lithium yttrium bromide sample has a crystalline structure represented by R-3m.

Example 4

Representative $Li_3YBr_6$ sample was formed using the process described in embodiments herein. FIG. 11 includes the structural model of the sample. As noted in the figure, the sample has a crystalline structure represented by a new small C2/m space group.

Example 5

Representative $Li_3YCl_6$ sample was formed using the process described in embodiments herein. FIG. 12 includes the structural model of the sample. As noted in the figure, the sample has a crystalline structure represented by $P6_3/mcm$ space group.

Example 6

Representative $Li_3YCl_6$ sample was formed using the process described in embodiments herein. FIG. 13 includes the structural model of the sample. As noted in the figure, the sample has a crystalline structure represented by $P6_3/mmc$ space group.

Example 7

Lithium yttrium bromide, $Li_3YBr_6$ was formed using the process described in embodiments herein. Decomposition of $NH_4Br$ was performed at 450° C. to 650° C. Crystalline structure and crystallinity characteristics are included in Table 2 below.

TABLE 2

| Samples | Space group | unit cell parameters a = b (Å) | unit cell parameters c (Å) | unit cell volume V (Å³) | Average crystallite size from XRD (nm) |
|---|---|---|---|---|---|
| 7-1 | R-3 m (rhombohedral) | 3.990 | 19.342 | 266.7 | 69 |

Comparing Sample 7-1 and Samples 1-1 to 1-3, it can be noted increasing the decomposition temperature can help increase crystallinity as shown by increased average crystallite sizes in Example 7 vs. Example 1.

Example 8

Representative lithium yttrium bromide, $Li_3YBr_6$, sample was formed in the same manner as described in Example 1 except an additional energetic ball-milling for 2 hours at 400 rpm in a planetary mill was applied after milling in the automatic agate mortar-pestle to obtain extra fine powder. The crystalline structure and crystallinity characteristics of the finally formed particles are included in Table 3 below.

TABLE 3

| Samples | Space group | unit cell parameters a = b (Å) | unit cell parameters c (Å) | unit cell volume V (Å³) | Average crystallite size from XRD (nm) |
|---|---|---|---|---|---|
| 8-1 | R-3 m (rhombohedral) | 3.990 | 19.352 | 266.8 | 48 |

Example 9

Represented lithium yttrium bromide, $Li_3YBr_6$, Sample 10-1 was formed by the process as described in embodiments herein, which includes a liquid acidic reaction in addition to ammonium complexation. Additional lithium yttrium bromide, $Li_3YBr_6$, Sample 10-2 was formed by performing the direct solid-state reaction of LiBr and $YBr_3$ at 450° C. for 24 h.

Figure 14A:
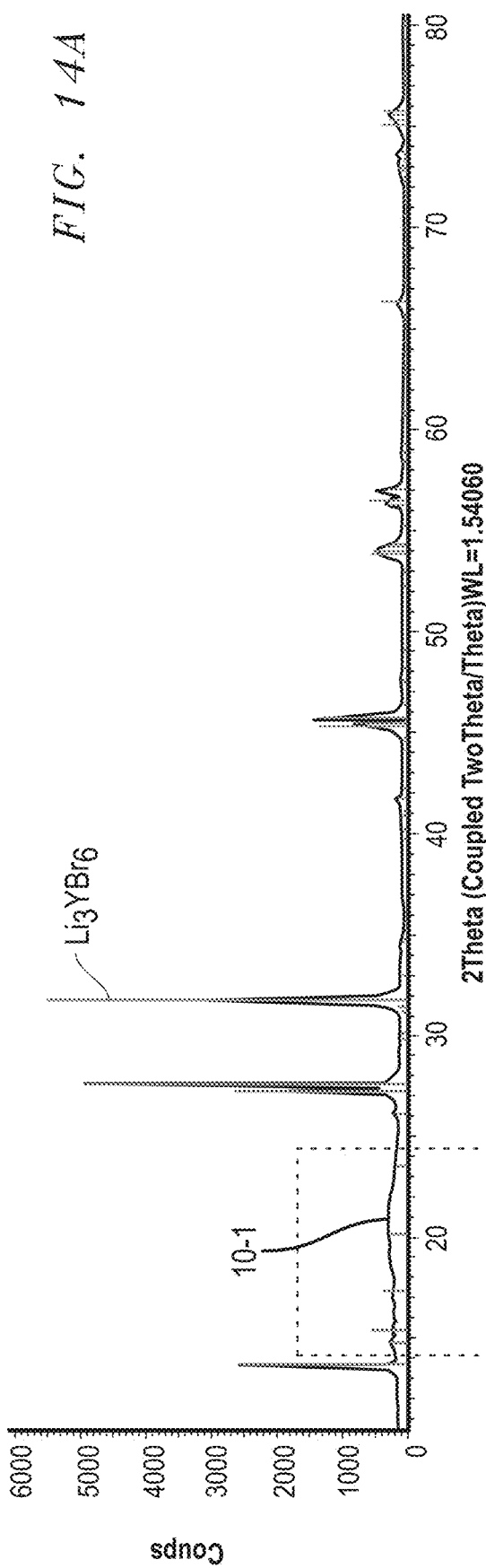
FIGS. 14A and 14B include illustrations including X-ray diffraction patterns of halide-based electrolyte materials.
Figure 14B:
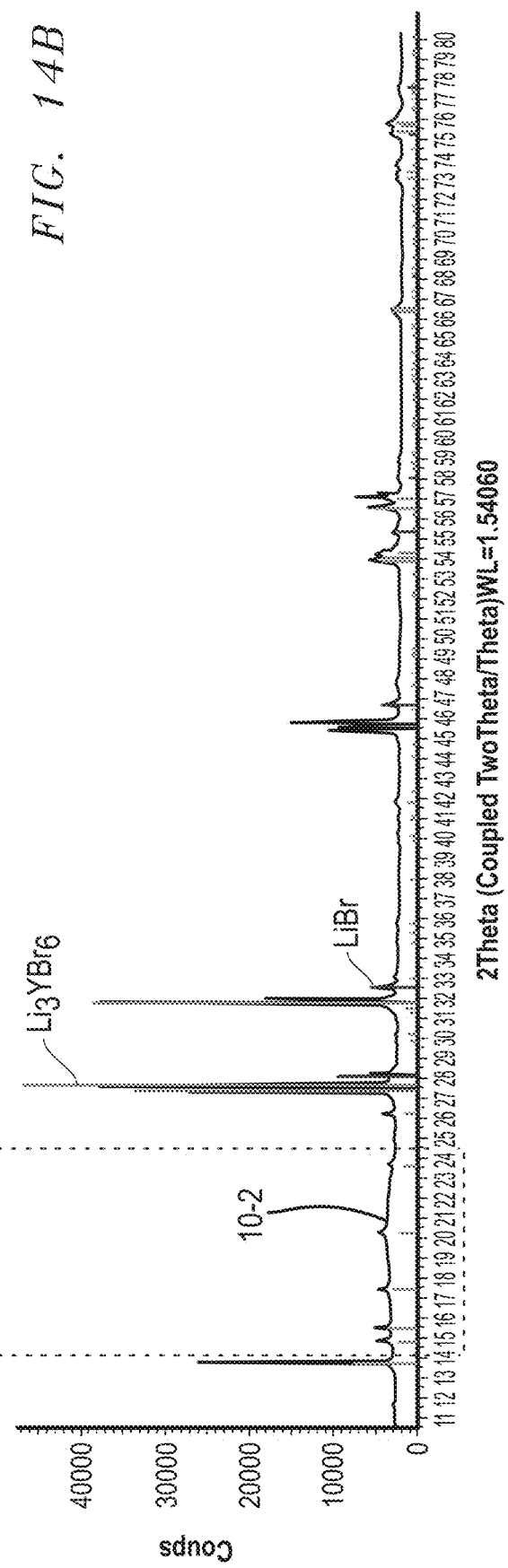

FIG. 14A includes the powder X-ray diffraction pattern of Sample 10-1 and the comparative superimposed XRD scan of conventional $Li_3YBr_6$. FIG. 14B includes the X-ray diffraction pattern of Sample 10-2 and the comparative superimposed XRD scan of conventional $Li_3YBr_6$. It can be noted Sample 10-1 does not include peaks within 16 to 25 deg (2-theta Cu-K-alpha), compared to the superimposed XRD scan of conventional $Li_3YBr_6$ and Sample 10-2. Sample 10-1 includes approximately 83%+/−5% stacking faults, while Sample 10-2 includes approximately 15%+/−5% stacking faults. The quantification of the stacking faults values is carried out using FAULTS software published in 2020 as described in embodiments herein.

Crystalline structure and crystallinity characteristics of Sample 10-2 are further included in Table 4 below.

TABLE 4

| Compound | Space Group | Unit cell parameters and volume | | | | | Average crystallite size (nm) |
|---|---|---|---|---|---|---|---|
| | | a (Å) | b (Å) | c (Å) | β (°) | Volume (Å) | |
| $Li_3YBr_6$ (main phase) | C2/m | 6.916 | 11.959 | 6.850 | 109.77 | 533.2 | 320 |

Example 10

Additional samples are formed utilizing the synthesis methods noted in Table 5 below. Content of impurity of binary metal halide is included in Table 1 and the phase for each impurity was detected by XRD analysis coupled with Rietveld refinements for quantitative analysis through the presence of characteristic diffraction peaks corresponding to the parasitic phases. Ionic conductivity of the samples was determined using an electrochemical impedance spectroscopy method with gold blocking electrodes under the condition of an AC frequency of 3 MHz-10 Hz and 10 to 50 mV of peak-to-peak sinusoidal AC voltage signal at room temperature (approximately 22° C.). The ionic conductivity noted herein is the ionic conductivity in bulk, which is the conductivity contribution from bulk grains that could be separated from grains boundary and the electrode contact because the bulk grain conductivity features appear at the highest frequencies and are associated with the lowest value of double-layer capacitance.

TABLE 5

| Sample | Composition | Synthesis method | Measured Ionic Conductivity, mS/cm | Impurities concentration, non-reacted or decomposed |
|---|---|---|---|---|
| C1.B | $Li_3YCl_6$ | High energy ball milling at room temperature for 24 hrs, with starting materials of dry LiCl and anhydrous $YCl_3$ at a stoichiometric proportion | 0.15 | 11.5 wt % LiCl + 8.0 wt % $YCl_3$ |
| C4.B | $Li_3YBr_6$ | High energy ball milling at room temperature for 24 hrs, using starting materials of dry LiBr and anhydrous $YBr_3$ at a stoichiometric proportion | 0.6 | 10.5 wt % LiBr + 7.5 wt % $YBr_3$ |
| C1.C | $Li_3YCl_6$ | Solid-state reaction with $NH_4Cl$ and Sublimation at 450° C. using starting materials of $Li_2CO_3$ and $Y_2O_3$ mixed at a stoichiometric proportion of 3*Li/Y being 1 and $NH_4Cl$ in excess | 0.05 | 14.5 wt % LiCl + 7 wt % YOCl + 3.5 wt % $YCl_3$ |
| C4.C | $Li_3YBr_6$ | Solid-state reaction with $NH_4Br$ and Sublimation at 450° C., using starting materials $Li_2CO_3$ and $Y_2O_3$ at 3*Li/Y being 1 stoichiometric proportion and $NH_4Br$ in excess | 0.45 | 13 wt % LiBr + 6 wt % YOBr + 3 wt % YBr |
| 10-1 | $Li_3YBr_6$ | The process for forming sample 10-1 as described in Example 9 | 1.5 | Impurities not detectable by XRD |

It is noted the high energy ball milling synthesis can generate in parallel the reactions of synthesis and the decomposition of the principal complex metal halide phase. Comparing to process of embodiments herein, the high energy ball milling synthesis can generate significantly higher contents of simple compounds, such as LiX and $YX_3$, that are present as impurities in the vicinity of the principal $Li_3YX_6$ phase. Higher contents of impurity phases can reduce the crystallinity of the halide-based materials. In instances, annealing may be performed to partially recover crystallinity, but annealing can also significantly reduce stacking faults of the halide-based material.

It is also noted a single phase of $Li_3YX_6$ may not be synthesized when starting from oxides ($Y_2O_3$) or carbonate materials ($Li_2CO_3$) with the addition of ammonium halide in the solid-state reaction at 1 bar atmospheric pressure. At least two chemical reactions can take place for converting the rare-earth metal (e.g., Y in the example of $Li_3YX_6$) into halide compounds. One principal reaction can result in $YX_3$ synthesis that can further react to form the $Li_3YX_6$ phase. The second reaction can result in the formation of YOX.

YOX is a stable compound and an impurity in the final product of $Li_3YX_6$. Generation of high-level rare earth oxy-halide phases (i.e., at least 6 wt %) in the halide-based material can result in extra XRD peaks that are characteristics of the impurity phases, and the quantification of stacking faults based on the XRD spectrum may not be reliable.

Example 11

Additional representative halide-based materials are formed in the same manner as described with respect to Sample 10-1 in Example 9. The formula of each sample is noted in Table 6. The content of stacking faults of each of the samples is determined in the same manner as described in Example 9. Each sample is expected to have 30 to 85% of stacking faults.

TABLE 6

| Sample | Composition |
|---|---|
| 11-1 | $Li_3In_{0.5}Y_{0.5}Cl_6$ |
| 11-2 | $Li_{2.7}Y_{0.7}Sn_{0.3}Cl_6$ |
| 11-3 | $Li_{2.65}Y_{0.65}Zr_{0.35}Cl_6$ |
| 11-4 | $Li_{2.6}Na_{0.05}Y_{0.65}Zr_{0.35}Cl_6$ |
| 11-5 | $Li_{2.95}Na_{0.05}YBr_6$ |
| 11-6 | $Li_3YBr_3Cl_3$ |

Figure 15:
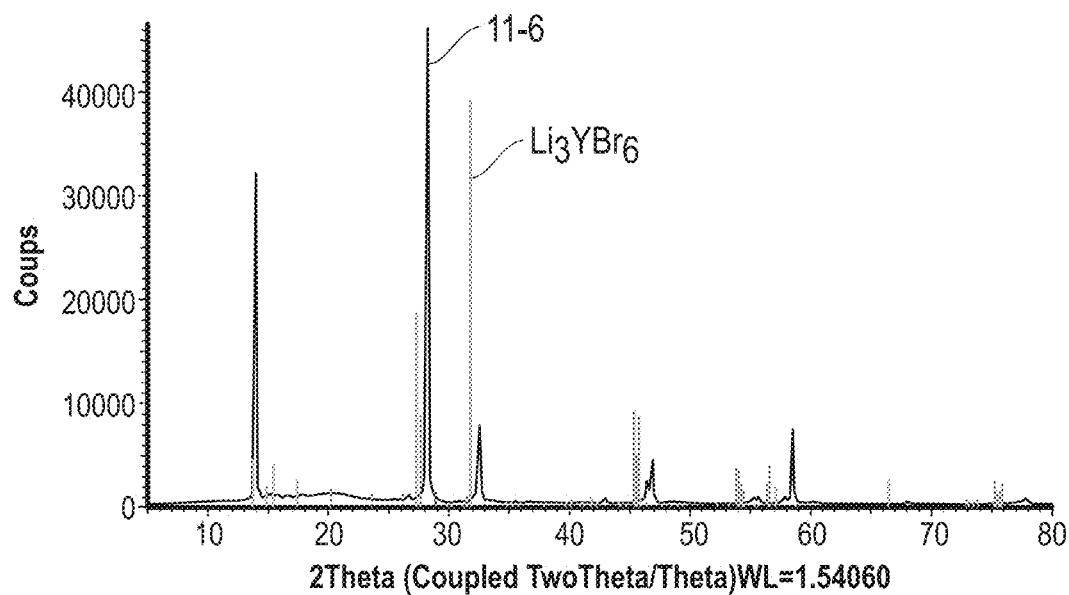
FIG. 15 includes an illustration including X-ray diffraction patterns of samples of halide-based electrolyte material.

FIG. 15 includes an XRD spectrum of Sample 11-6 and the comparative superimposed XRD scans for a conventional $Li_3YBr_6$. It can be noted that certain peaks between 15° and 25° 2-theta with Cu K-alpha radiation are absent from the spectrum of Sample 11-6, compared to the XRD scan of conventional $Li_3YBr_3$.

Example 12

Figure 16:
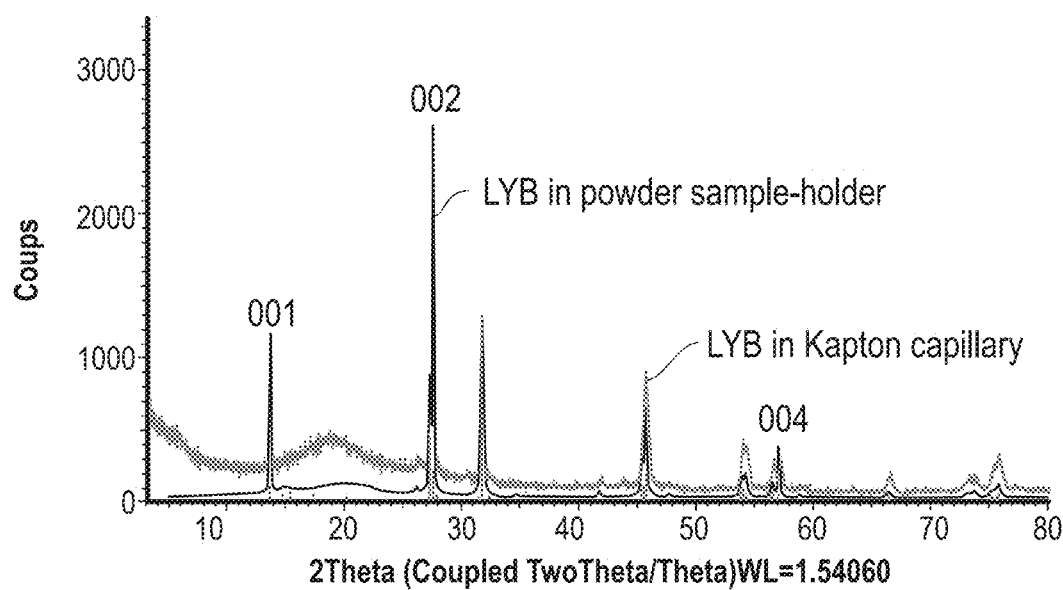
FIG. 16 includes an illustration including X-ray diffraction patterns of a halide-based electrolyte material.

Powder XRD measurements of Sample 10-1 is carried out in sealed Kapton capillary tubes in transmission geometry and regular powder sample holder, respectively. FIG. 16 includes an overlay of XRD spectra from the tests. It can be noted that both spectra demonstrate an absence of certain peaks between 15° and 25° 2-theta with Cu K-alpha radiation, compared to positions of bars that represent XRD peaks of conventional $Li_3YBr_3$.

Example 13

Lithium yttrium bromide, $Li_3YBr_6$ is formed using the process described in embodiments herein. Decomposition of $NH_4Br$ is performed. The reaction mixture is heated to 650° C. in 30 minutes and kept for 15 min for decomposition of NH4Br, and then cooled down to room temperature in 1 h. Quick cool down from higher temperatures can promote the formation of stacking faults. The content of stacking faults of the sample is estimated to be approximately 50%.

Example 14

Lithium yttrium bromide, $Li_3YBr_6$ is formed using the process described in embodiments herein. Decomposition of $NH_4Br$ is performed at 350 C-440° C. for the during of at least 1.5 hours before cooling down. The content of stacking faults of the sample is expected to be 10-20%.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include a range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A solid electrolyte material, comprising:
    $M_{3-z}(Me^{k+})_f X_{3-z+k*f}$, wherein $-3 \leq z < 3$; $2 \leq k \leq 6$; $0 \leq f \leq 1$; M comprises an alkali metal element; Me comprises a divalent metal element, a trivalent metal element, a tetravalent metal element, a pentavalent metal element, a hexavalent metal element, or any combination thereof; and X comprises a halogen;
    a crystalline structure including stacking faults of at least 20% and an average diffraction crystallite size of at least 25 nm.

2. The solid electrolyte material of claim 1, wherein the crystalline structure is represented by C2/m space group.

3. The solid electrolyte material of claim 1, wherein the crystalline structure comprises at least 50% stacking faults.

4. The solid electrolyte material of claim 1, wherein X-ray diffraction pattern measured with Cu K-alpha radiation includes an absence of a peak between 16° and 25° 2-theta.

5. The solid electrolyte material of claim 1, wherein M comprises at least one of Li or Na.

6. The solid electrolyte material of claim 1, wherein Me comprises a rare earth element, Zr, Sn, or any combination thereof.

7. The solid electrolyte material of claim 1, wherein Me comprises Y.

8. The solid electrolyte material of claim 1, wherein X comprises Cl, Br, or a combination thereof.

9. The solid electrolyte material of claim 1, wherein the solid electrolyte material consists of Li, Y, Cl, and Br.

10. The solid electrolyte material of claim 1, comprising a crystalline phase comprising a crystalline structure represented by P-3m1 or Pnma space group.

11. The solid electrolyte material of claim 1, wherein the crystalline structure comprises at least 70% stacking fault.

12. A solid electrolyte material, comprising
    $M_{3-z}(Me^{k+})_f X_{3-z+k*f}$, wherein $-3 \leq z < 3$; $2 \leq k \leq 6$; $0 \leq f \leq 1$; M comprises an alkali metal element; Me comprises a divalent metal element, a trivalent metal element, a tetravalent metal element, a pentavalent metal element, a hexavalent metal element, or any combination thereof; and X comprises a halogen;
    a crystalline structure represented by a rhombohedral space group or a hexagonal space group and including an average diffraction crystallite size of at least 25 nm.

13. The solid electrolyte material of claim 12, comprising a crystalline phase comprising a crystalline structure represented by R-3m space group.

14. The solid electrolyte material of claim 12, comprising a crystalline phase comprising a crystalline structure represented by $P6_3/mcm$ or $P6_3/mmc$ space group.

15. The solid electrolyte material of claim 12, wherein M comprises Li, Na, or a combination thereof, wherein Me comprises Y, Ce, Gd, Er, Zr, La, Yb, In, Mg, Zn, Sn or any combination thereof, and wherein X comprises at least one of Br and Cl.

16. The solid electrolyte material of claim 12, wherein the crystalline structure comprises stacking faults of at least 90% and an average diffraction crystallite size of at least 30 nm and at most 500 nm.

17. The solid electrolyte material of claim 12, wherein the crystalline structure comprises:
    a layered atomic arrangement; and
    at least one of the following:
    atomically disordered vacancy and Me atoms;
    disordered X1 and X2 atoms, wherein X1 and X2 represent two different halogen atoms;
    disordered vacancy sites and M atoms;
    disordered M and Me atoms;
    disordered M, Me, and vacancy atoms; or
    any combination thereof.

18. A solid electrolyte material, comprising:
    $M_{3-z}(Me^{k+})_f X_{3-z+k*f}$, wherein $-3 \leq z < 3$; $2 \leq k \leq 6$; $0 \leq f \leq 1$; M comprises an alkali metal element; Me comprises a divalent metal element, a trivalent metal element, a tetravalent metal element, a pentavalent metal element, a hexavalent metal element, or any combination thereof; and X comprises a halogen;
    a crystalline structure represented by a monoclinic space group having a unit cell containing between 3 and 5 halide atoms and including an average diffraction crystallite size of at least 25 nm.

19. The solid electrolyte material of claim 18, comprising a crystalline phase comprising a crystalline structure represented by C2/m space group.

20. The solid electrolyte material of claim 18, comprising a layered atomic arrangement; and wherein the average diffraction crystallite size is at least 35 nm.

* * * * *

UNITED STATES PATENT AND TRADEMARK OFFICE
CERTIFICATE OF CORRECTION

PATENT NO. : 11,637,315 B2
APPLICATION NO. : 17/734591
DATED : April 25, 2023
INVENTOR(S) : Vladimir Ouspenski et al.

It is certified that error appears in the above-identified patent and that said Letters Patent is hereby corrected as shown below:

On the Title Page

In Column 1, Item (56), OTHER PUBLICATIONS, page 2, Line 4, please delete "et al. "Temäre Halogenide" and insert --et al. "Ternäre Halogenide--

In Column 1, Item (56), OTHER PUBLICATIONS, page 2, Line 4-5, please delete "[1]. Temare Halogenide" and insert --[1]. Ternäre Halogenide--

In Column 1, Item (56), OTHER PUBLICATIONS, page 2, Line 6, please delete "Strukturen, Ionenleitfahigkeit,"" and insert --Strukturen, Ionenleitfähigkeit,"--

In Column 1, Item (56), OTHER PUBLICATIONS, page 2, Line 9, please delete "et al. "Temäre Halogenide" and insert --et al. "Ternäre Halogenide--

In Column 1, Item (56), OTHER PUBLICATIONS, page 2, Line 10, please delete "Natrium-Ionenleitfahigkeit der" and insert --Natrium-Ionenleitfähigkeit der--

In Column 1, Item (56), OTHER PUBLICATIONS, page 2, Line 14, please delete "et al. "Temäre Halogenide" and insert --et al. "Ternäre Halogenide--

In Column 1, Item (56), OTHER PUBLICATIONS, page 2, Line 14-15, please delete "[1]. Ternare Chloride" and insert --[1]. Ternäre Chloride--

In Column 1, Item (56), OTHER PUBLICATIONS, page 2, Line 19, please delete "et al. "Temäre Halogenide" and insert --et al. "Ternäre Halogenide--

In Column 2, Item (56), OTHER PUBLICATIONS, page 2, Line 14, please delete "Gomboiz, M." and insert --GOMBOTZ, M.--

Signed and Sealed this
First Day of October, 2024

Katherine Kelly Vidal
*Director of the United States Patent and Trademark Office*

CERTIFICATE OF CORRECTION (continued)
U.S. Pat. No. 11,637,315 B2

In Column 2, Item (56), OTHER PUBLICATIONS, page 2, Line 42, please delete "et al. "Ternare Halogenide" and insert --et al. "Ternäre Halogenide--

In Column 2, Item (56), OTHER PUBLICATIONS, page 2, Line 43, please delete "Strukturen, fhermisches Verhalten." and insert --Strukturen, Thermisches Verhalten.--

In Column 2, Item (56), OTHER PUBLICATIONS, page 2, Line 54, please delete "Bromides Mbr"""" and insert --Bromides Mbr3""--

In Column 1, Item (56), OTHER PUBLICATIONS, page 3, Line 19, please delete "Strukturen, lonenleitfahigkeit der" and insert --Strukturen, Ionenleitfähigkeit der--

In the Claims

In Column 33, Line 41, please delete "$0 \leq f \leq 1$;" and insert --$0 < f \leq 1$;--

In Column 34, Line 9, please delete "stacking fault." and insert --stacking faults.--

In Column 34, Line 11, please delete "$0 \leq f \leq 1$;" and insert --$0 < f \leq 1$;--

In Column 34, Line 47, please delete "$0 \leq f \leq 1$;" and insert --$0 < f \leq 1$;--